(12) United States Patent
Kanemoto et al.

(10) Patent No.: US 8,498,772 B2
(45) Date of Patent: Jul. 30, 2013

(54) CONTROL APPARATUS AND METHOD FOR A VEHICLE HAVING IDLE STOP FUNCTION

(75) Inventors: Kyohei Kanemoto, Toyota (JP); Ryouta Nakamura, Handa (JP)

(73) Assignee: Denso Corporation, Kariya (JP)

( * ) Notice: Subject to any disclaimer, the term of this patent is extended or adjusted under 35 U.S.C. 154(b) by 356 days.

(21) Appl. No.: 13/037,601

(22) Filed: Mar. 1, 2011

(65) Prior Publication Data
US 2011/0213525 A1    Sep. 1, 2011

(30) Foreign Application Priority Data
Mar. 1, 2010    (JP) ................................ 2010-044221

(51) Int. Cl.
*G01M 17/00*    (2006.01)
(52) U.S. Cl.
USPC .......................................... 701/29.1; 701/29.2
(58) Field of Classification Search
USPC ............................................... 701/29.1–29.2
See application file for complete search history.

(56) References Cited

U.S. PATENT DOCUMENTS

| | | | |
|---|---|---|---|
| 5,905,315 A | 5/1999 | Lefebvre et al. | |
| 6,837,202 B1 * | 1/2005 | Lu ........................... | 123/179.27 |
| 7,034,643 B1 * | 4/2006 | Kusumoto et al. ............ | 335/126 |
| 8,290,692 B2 * | 10/2012 | Kitano et al. .................. | 701/113 |
| 2009/0241884 A1 | 10/2009 | Saitoh et al. | |
| 2010/0090526 A1 * | 4/2010 | Itou ............................... | 307/10.6 |
| 2010/0180849 A1 * | 7/2010 | Senda et al. ................ | 123/179.4 |
| 2010/0256896 A1 * | 10/2010 | Kitano et al. .................. | 701/113 |
| 2010/0264670 A1 | 10/2010 | Usami et al. | |
| 2011/0115238 A1 * | 5/2011 | Biessenberger et al. .... | 290/38 R |

FOREIGN PATENT DOCUMENTS

| | | |
|---|---|---|
| JP | 11-030139 | 2/1999 |
| JP | 2002-371943 | 12/2002 |
| JP | 2006-322332 | 11/2006 |
| JP | 2007-040270 | 2/2007 |
| JP | 2008-111343 | 5/2008 |
| JP | 2008-121648 | 5/2008 |

* cited by examiner

*Primary Examiner* — Hussein A. Elchanti
(74) *Attorney, Agent, or Firm* — Nixon & Vanderhye PC

(57) ABSTRACT

In an idle stop vehicle, a starter has separately an electromagnetic switch for energizing a motor and a pinion control solenoid for engaging a pinion gear with a ring gear. A coil of the solenoid is energized by a battery through a relay. For starting an engine, an ECU turns on the relay and the electromagnetic switch so that the starter cranks an engine. During engine operation, the ECU turns on only the relay while maintaining turn-off of the electromagnetic switch. If a voltage of a current supply path between the relay and the coil is lower than a predetermined threshold value, the ECU prohibits automatic idle stop by determining that the current supply path to the coil has abnormality.

31 Claims, 9 Drawing Sheets

| ABNORMALITY | INITIAL START | ENGINE OPERATION | IDLE STOP | RESTART |
|---|---|---|---|---|
| ENERGIZATION DISABILITY (F1=1); GND SHORT (B, C); WIRE BREAK (A, B); RELAY-OFF FAILURE | A9: WARNING TO USER<br>A10: MOTOR ENERGIZATION TIME LIMITATION | A1: WARNING TO USER<br>A2: PROMOTION OF ENGINE NON-STOP<br>A3: PROHIBITION OF IDLE STOP | A4: WARNING TO USER<br>A5: HAZARD LIGHT ON AND OFF | A6: WARNING TO USER<br>A7: HAZARD LIGHT ON AND OFF<br>A8: MOTOR ENERGIZATION TIME LIMITATION |
| WIRE BREAK (F3=1); WIRE BREAK AT DOWNSTREAM FROM P2 | B9: WARNING TO USER<br>B10: MOTOR ENERGIZATION TIME LIMITATION | B1: WARNING TO USER<br>B2: PROMOTION OF ENGINE NON-STOP<br>B3: PROHIBITION OF IDLE STOP | B4: WARNING TO USER<br>B5: HAZARD LIGHT ON AND OFF | B6: WARNING TO USER<br>B7: HAZARD LIGHT ON AND OFF<br>B8: MOTOR ENERGIZATION TIME LIMITATION |
| ENERGIZATION RELEASE DISABILITY (F2=1); BATTERY SHORT (B, C); RELAY-ON FAILURE | C11: WARNING TO USER<br>C12: PROMOTION OF NO-RAISE OF ENGINE SPEED | C1: WARNING TO USER<br>C2: PROMOTION OF NO-RAISE OF ENGINE SPEED<br>C3: PROMOTION OF ENGINE NON-STOP<br>C4: PROHIBITION OF IDLE STOP<br>C5: ENGINE SPEED LIMITATION, AND HAZARD LIGHT ON AND OFF | C6: WARNING TO USER<br>C7: PROMOTION OF NO-RAISE OF ENGINE SPEED<br>C8: ENGINE STARTING | C9: WARNING TO USER<br>C10: PROMOTION OF NO-RAISE OF ENGINE SPEED |

FIG. 3

| | | (a) | (b) | (c) | (d) |
|---|---|---|---|---|---|
| | SECTION A | NORMAL | | WIRE BREAK | BATTERY SHORT |
| | SECTION B | | WIRE BREAK (DOWNSTREAM P2) | WIRE BREAK, GND SHORT | BATTERY SHORT |
| | SECTION C | | | GND SHORT | BATTERY SHORT |
| | RELAY 33 | | | OFF-FAILURE | ON-FAILURE |
| RELAY-ON INSTRUCTION (TR52: ON) | FIRST COMPARATOR OUTPUT V1 | Hi | Hi | Lo | Hi |
| | SECOND COMPARATOR OUTPUT V2 | Hi | Hi | Lo | Hi |
| RELAY-OFF INSTRUCTION (TR52: OFF) | FIRST COMPARATOR OUTPUT V1 | Lo | Lo | Lo | Hi |
| | SECOND COMPARATOR OUTPUT V2 | Lo | Hi | Lo | Hi |

FIG. 10

| ABNORMALITY | INITIAL START | ENGINE OPERATION | IDLE STOP | RESTART |
|---|---|---|---|---|
| ENERGIZATION DISABILITY (F1=1): GND SHORT (B, C); WIRE BREAK (A, B); RELAY-OFF FAILURE | A9: WARNING TO USER<br>A10: MOTOR ENERGIZATION TIME LIMITATION | A1: WARNING TO USER<br>A2: PROMOTION OF ENGINE NON-STOP<br>A3: PROHIBITION OF IDLE STOP | A4: WARNING TO USER<br>A5: HAZARD LIGHT ON AND OFF | A6: WARNING TO USER<br>A7: HAZARD LIGHT ON AND OFF<br>A8: MOTOR ENERGIZATION TIME LIMITATION |
| WIRE BREAK (F3=1): WIRE BREAK AT DOWNSTREAM FROM P2 | B9: WARNING TO USER<br>B10: MOTOR ENERGIZATION TIME LIMITATION | B1: WARNING TO USER<br>B2: PROMOTION OF ENGINE NON-STOP<br>B3: PROHIBITION OF IDLE STOP | B4: WARNING TO USER<br>B5: HAZARD LIGHT ON AND OFF | B6: WARNING TO USER<br>B7: HAZARD LIGHT ON AND OFF<br>B8: MOTOR ENERGIZATION TIME LIMITATION |
| ENERGIZATION RELEASE DISABILITY (F2=1): BATTERY SHORT (B, C); RELAY-ON FAILURE | C11: WARNING TO USER<br>C12: PROMOTION OF NO-RAISE OF ENGINE SPEED | C1: WARNING TO USER<br>C2: PROMOTION OF NO-RAISE OF ENGINE SPEED<br>C3: PROMOTION OF ENGINE NON-STOP<br>C4: PROHIBITION OF IDLE STOP<br>C5: ENGINE SPEED LIMITATION, AND HAZARD LIGHT ON AND OFF | C6: WARNING TO USER<br>C7: PROMOTION OF NO-RAISE OF ENGINE SPEED<br>C8: ENGINE STARTING | C9: WARNING TO USER<br>C10: PROMOTION OF NO-RAISE OF ENGINE SPEED |

CONTROL APPARATUS AND METHOD FOR A VEHICLE HAVING IDLE STOP FUNCTION

CROSS REFERENCE TO RELATED APPLICATION

This application is based on and incorporates herein by reference Japanese patent application No. 2010-044221 filed on Mar. 1, 2010.

FIELD OF THE INVENTION

The present invention relates to a control apparatus and a control method for a vehicle having an idle stop function.

BACKGROUND OF THE INVENTION

In an automotive vehicle in recent years, an engine automatic stop and start system, which is generally referred to as an idle stop system (idle reduction system), is provided to automatically stop an engine when a predetermined stop condition is satisfied and thereafter automatically start the engine when a predetermined start condition is satisfied (for example, patent document 1).

The patent document 1 discloses a starter, in which a pinion gear driven to rotate by a motor is switchable to a state of engagement with a ring gear of the engine or a state of disengagement from the ring gear independently of current supply or no current supply to a motor of the starter, that is, irrespective of energization or deenergization of the motor. This kind of motor, in which the motor and the pinion gear are controllable independently, is referred to as an independently-controlled starter. Such an independently controlled starter may be provided in a vehicle (idle stop vehicle), which is provided with the idle stop system.

More specifically, the pinion gear is driven to rotate by the starter motor while being engaged with the ring gear of the engine so that the engine is cranked by rotation of the ring gear of the engine. A pinion control solenoid and a pinion control relay are provided separately from a relay, which switches over energization and deenergization of the starter motor. The pinion control solenoid is for driving the pinion gear for engagement with the ring gear of the engine. The pinion control relay is located upstream the pinion control solenoid (more specifically, upstream of a coil of the pinion control solenoid) for switching over energization and deenergization of the coil. A solenoid coil is generally referred to as a solenoid in the field of electric technology. In this description, however, a solenoid is also referred to as an actuator, which includes a coil and movable parts driven by electromagnetic force of the coil in the field of electromechanical technology.

In the patent document 1, the pinion gear is engaged with the ring gear by turning on the pinion control relay to energize the coil of the pinion control solenoid after the engine is automatically stopped by the function of the idle stop system. For restarting the engine, the starter motor is energized to crank the engine with the ring gear and the pinion gear having been already engaged with each other. Thus wear of the pinion gear of the starter and the ring gear of the engine is reduced. In addition, noise sound and vibration generated by engagement of the gears are also reduced. Since the engine is automatically stopped and automatically started during a travel (including a state of zero vehicle speed) in the idle stop vehicle, it is more likely that the independently controlled starter is used to reduce wear, noise sound and vibration.

Patent document 2 discloses detection of failure of a starter, which is different from the independently controlled starter, by measuring a contact resistance between electrical contacts in an electric circuit provided for driving a motor of the starter.

[Patent document 1] JP H11-30139A
[Patent document 2] JP 2008-111343A

In an independently controlled starter, position of a pinion gear cannot be switched over (that is, switching between states of engagement disengagement with a ring gear) even in a case that abnormality arises in not only a current supply path to the motor but also in a current supply path to the coil of the pinion control solenoid. This may cause some troubles in starting an engine.

In both patent documents 1 and 2, no abnormality is detected in the current supply path to the coil of the pinion control solenoid and no countermeasure for such abnormality is proposed.

Since a contact resistance between electrical contacts is measured according to technology of the patent document 2, configuration for detecting abnormality becomes complicated. For example, a measuring device for measuring the resistance need be provided in the starter and the measuring device need be a high-precision device.

SUMMARY OF THE INVENTION

It is therefore an object of the present invention to detect abnormality arising in a current supply path to a coil of a pinion control solenoid and to enable appropriate countermeasure in simple configuration.

According to one aspect of the present invention, a control apparatus is provided for a vehicle, which includes a starter, motor energization switch means, a pinion control solenoid, pinion control switch means, idle stop control means. The starter has a motor and a pinion gear for cranking an engine by being driven to rotate by the motor under engagement with a ring gear of the engine. The pinion gear is switchable to a state of engagement with the ring gear and a state of disengagement from the ring gear irrespective of energization or deenergization of the motor. The motor energization switch means is provided in a current supply path between a power source and the motor and selectively driven to an on-state for conducting the current supply path and an off-state for interrupting the current supply path. The pinion control solenoid having a coil connected to a ground line at one end thereof. The pinion control solenoid drives the pinion gear to be engaged with the ring gear and disengaged from the pinion gear when a voltage of the power source is supplied and stopped to the other end of the coil, respectively. The pinion control switch means is provided in a current supply path between the power source and the other end of the coil and selectively driven to an on-state for conducting the current supply path and an off-state for interrupting the current supply path. The stop control means for automatically stopping the engine when a predetermined automatic stop condition is satisfied and thereafter automatically restarting the engine when a predetermined automatic restart condition is satisfied.

The control apparatus includes control means and operation-time abnormality detection means. The control means drives both the pinion control switch means and the motor energization switch means to an on-state so that the starter cranks the engine in each of an initial start time, in which the engine is started in accordance with a starting operation of a driver, and a restart time, in which the idle stop control means restarts the engine. The operation-time abnormality detection means drives only the pinion control switch means between the pinion control switch means and the motor energization switch means during engine operation, checks whether a voltage at a specified point in a current supply path between the pinion control switch means and the coil is lower than a predetermined energization disability determination reference value in such a driven state, and determines that a coil energization disability abnormality is present when the voltage is lower than the predetermined energization disability determination reference value. The coil energization disability abnormality indicates that current supply to the coil is disabled. The idle stop control means is prohibited from stopping the engine when the operation-time abnormality detection means determines presence of the coil energization disability abnormality.

It is noted that, if the energization disability abnormality is present, the pinion control solenoid means cannot be energized and the pinion gear cannot engage the motor to the ring gear for the automatic restarting after the engine has once been automatically stopped by the idle stop control. This problem can be countered by the control apparatus. Although the pinion gear will be engaged with the ring gear and rotated by the engine, which is operating normally, if the pinion control solenoid is normally energized, the rotation of the ring gear is not transferred to the motor by way of one-way clutch. Therefore, forcibly energizing the pinion control solenoid in the midst of engine operation will not adversely affect.

According to another aspect of the present invention, an engine is automatically stopped when a predetermined idle stop condition is satisfied, and the engine is restarted by automatically supplying currents to a motor of a starter and a pinion control actuator for cranking the engine by the motor through a pinion gear of the starter when a predetermined restart condition is satisfied. A control apparatus turns on a pinion control switch to supply current to the pinion control actuator from a battery while the engine is in operation for vehicle travel with the motor being in a deenergized state. The control apparatus checks whether an abnormality is present in a current supply path from the battery to the pinion control actuator. The control apparatus prohibits the engine from being stopped in response to satisfaction of the predetermined idle stop condition, when presence of the abnormality in the current supply path is determined. The abnormality in the current supply path includes at least one of disability of energization of the pinion control actuator, disconnection of the current supply path to the pinion control actuator and disability of releasing current flow in the current supply path to the pinion control actuator.

BRIEF DESCRIPTION OF THE DRAWINGS

The above and other objects, features and advantages of the present invention will become more apparent from the following detailed description made with reference to the accompanying drawings. In the drawings:

FIG. 3 is a table showing a relation among contents of abnormality, drive state of a relay and two comparator outputs in the embodiment;

FIG. 10 is a table showing contents of fail-safe processing executed in the embodiment.

DETAILED DESCRIPTION OF THE PREFERRED EMBODIMENT

Figure 1:
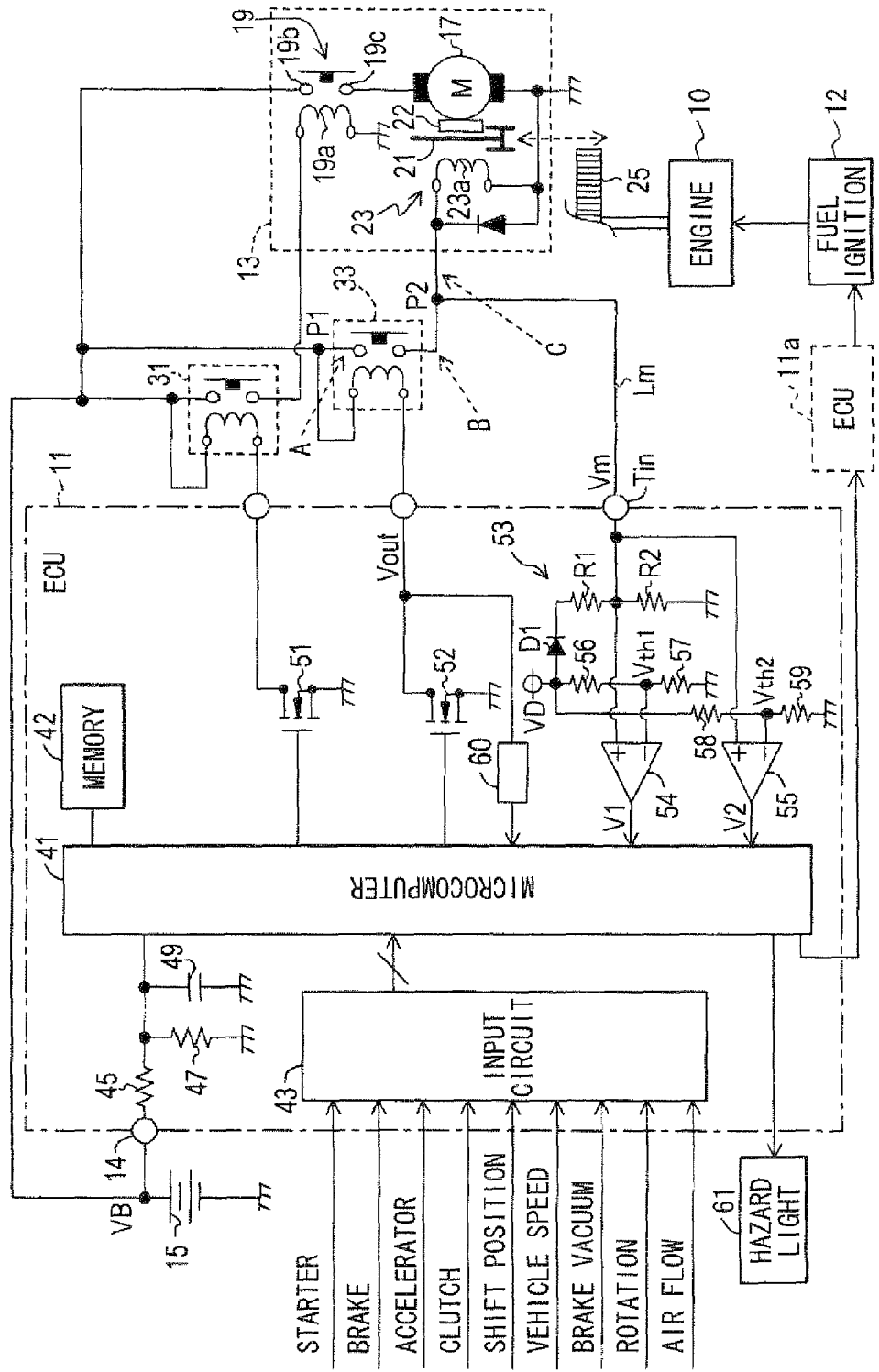
FIG. 1 is a circuit diagram showing a starter control apparatus according to an embodiment of the present invention and its peripheral devices forming a starter control system for an idle stop vehicle.

An electronic control unit (ECU) 11, which is referred to as a controller or a starter control apparatus, is provided in a vehicle (not shown) having idle stop function to not only control a starter 13 for starting an engine 10 of the vehicle but also perform idle stop control for automatically stopping and restarting the engine 10. It is assumed that a transmission of the vehicle is a manual transmission. It is also assumed that the ECU 11 also controls fuel injection, spark ignition and the like in the conventional manner through engine control actuators 12 such as fuel injection devices, ignition devices and the like, although not shown or described in detail.

The ECU 11 receives a starter signal, a brake signal, an accelerator signal, a clutch signal, a shift position signal, a vehicle speed signal, a brake vacuum signal, a rotation signal and the like. The starter signal is changed to an active level when a driver of the vehicle performs a manual starting operation (for example, turning a key inserted into a key cylinder to a start position or pressing a start button). The brake signal is generated by a sensor, which detects pressing-down of a brake pedal. The accelerator signal is generated by a sensor, which detects pressing-down of an accelerator pedal. The clutch signal is generated by a sensor, which detects pressing-down of a clutch pedal. The shift position signal is generated by a sensor, which detects a manipulation position (shift position) of a shift lever of the manual transmission. The vehicle speed signal is generated by a sensor, which detects a travel speed (vehicle speed) of the vehicle. The brake vacuum signal is generated by a sensor, which detects a brake vacuum (vacuum pressure of a brake booster device). The rotation signal is generated by a crankshaft sensor or a camshaft sensor. A battery voltage VB (about 12V in the present embodiment), which is an output voltage of a vehicle-mounted battery (corresponding to a power source) 15 is inputted to a battery voltage monitor terminal 14 of the ECU 11. In case that the battery voltage VB is supplied to an ignition system power supply line (wire) in the vehicle (that is, ignition-on state), the ECU 11 operates with electric power of the ignition system power supply line.

The starter 13 may be a type disclosed in US 2010/0264670 A1, the description of which is incorporated herein. The starter 13 includes, for example, a starter motor 17, an electromagnetic switch 19, a pinion gear 21, a one-way clutch 22, and a pinion control solenoid 23. The motor 17 is a drive power source, which cranks the engine 10. The electromagnetic switch 19 is provided to energize the motor 17 by supplying current therethrough. The pinion control solenoid 23 is provided for actuating the pinion gear 21 to be driven by the motor 17 through the one-way clutch 22. As known conventionally, the one-way clutch 21 transfers rotation of the motor 17 to the pinion gear 21 for driving the ring gear 25 but does not transfer rotation of the pinion gear 22 rotated by the ring gear 25 to the motor 17.

The electromagnetic switch 19 is a large-sized relay located in a current supply path leading from the battery 15 to the motor 17 in series with the battery 15 and the motor 17 and selectively driven to one of an on-state for conducting the current supply path and an off-state for interrupting the current supply path.

Specifically, the electromagnetic switch 19 includes a coil 19a and a pair of contacts 19b and 19c. One end of the coil 19a of the electromagnetic switch 19 is grounded. When the battery voltage VB is supplied to the other end (positive side) of the coil 19a and the coil 19a is energized, the contacts 19b and 19c are shorted to provide a current supply path (on-state). When the coil 19a is not energized, the contacts 19b and 19c are disconnected to interrupt the current supply path (off-state).

The pinion control solenoid 23 is a solenoid as an actuator for switching over a state or a position of the pinion gear 21 to an engaged state and a disengaged state, in which the pinion gear 21 is engaged with and disengaged from a ring gear 25 of the engine 10.

Specifically, the pinion control solenoid 23 includes a coil 23a, one end of which is grounded, and a biasing member (not shown) such as a spring. When the coil 23a is not energized, the pinion gear 21 is biased by the biasing member to the initial position (shown in FIG. 1), at which the pinion gear 21 is disengaged from the ring gear 25, that is, not engaged with the ring gear 25. When the battery voltage VB is supplied to the other end (positive side) of the coil 23a and the coil 23a is energized, the pinion gear 21 is pushed outward of the starter 13 by electromagnetic force for engagement with the ring gear 25 as shown by a dotted arrow in FIG. 1.

When the motor 17 is energized under a state, in which the pinion gear 21 is in engagement with the ring gear 25, rotation force of the motor 17 is transferred to the ring gear 21 through the pinion gear 21 for cranking the engine 10.

A motor control relay 31 is provided outside the ECU 11 in the vehicle. When the motor control relay 31 is turned on, the battery voltage VB is supplied to the other end (upstream or positive side) of the coil 19a of the electromagnetic switch 19 to drive the electromagnetic switch 19 to the on-state by current supply to the coil 19a.

In addition, a pinion control relay 33 is provided outside the ECU 11 and in series with the battery 15 and the pinion control solenoid 23. When the pinion control relay 33 is turned on, the battery voltage VB is supplied to the other end (upstream or positive side) of the coil 23a of the pinion control solenoid 23 to engage the pinion gear 21 with the ring gear 25 by current supply to the coil 23a.

More specifically, the pinion control relay 33 has a coil and a pair of contacts. This coil is supplied with the battery voltage VB at one end (positive side) and grounded (that is, connected to the ground line) by the ECU 11. The pair of contacts is located in the current supply path, which extends from the battery 15 to the other end of the coil 23a of the pinion control solenoid 23. When the other end (downstream or negative side) of the coil of the pinion control relay 33 is grounded to energize the coil, the contacts of the pinion control relay 33 is shorted to conduct the current supply path from the battery 15 to the coil 23a (on-state). When the coil of the pinion control relay 33 is not energized, the contacts of the pinion control relay 33 opens to interrupt the current supply path from the battery 15 to the coil 23a (off-state).

Although not described, the motor control relay 31 is similar to the pinion control relay 33 as shown in FIG. 1. When the downstream side of the coil of the motor control relay 31 is grounded by the ECU 11, a pair of contacts is shorted to form an on-state and supply current the coil 19a of the electromagnetic switch 19.

The ECU 11 includes a microcomputer 41, an input circuit 43, two resistors 45 and 47 and a capacitor 49. The microcomputer 41 executes various programmed processing such as idle stop control and other control for the starter 13. The input circuit 43 inputs various signals such as the starter signal to the microcomputer 43. The resistors 45 and 47 divide the battery voltage VB inputted from the battery voltage monitor terminal 14 to a voltage value, which is within an acceptable range of the microcomputer 41. The capacitor 49 is provided between a voltage line of a junction of the resistors 45, 47 and the ground line to filter out noises. The microcomputer 41 detects the battery voltage VB by converting the voltage developed at the junction of the resistors 45 and 47 by its internal A/D converter (not shown). The microcomputer 41 also detects voltage values of analog signals among signals inputted from the input circuit 43 by A/D conversion of the internal A/D converter.

The ECU 11 further includes a transistor 51 and a transistor 52. The transistor 51, when turned on, turns on the motor control relay 31 by connecting the downstream side of the coil of the motor control relay 31 to the ground line (that is, grounding). The transistor 52, when turned on, turns on the pinion control relay 33 by connecting the downstream end of the coil of the pinion control relay 33 to the ground line. As a result, when the transistor 51 turns on, the motor control relay 31 turns on and supplies current to the coil 19a of the electromagnetic switch 19 so that the electromagnetic switch 19 turns on to supply electric current to the motor 17. When the transistor 52 turns on, the pinion control relay 33 turns on and supplies current to the coil 23a of the pinion control solenoid 23 so that the pinion 21 is driven to engage the ring gear 25. Each of the transistors 51 and 52 is controlled by the microcomputer 41.

At an outside part of the ECU 11, one end of an abnormality detection wire Lm is connected at a specified point P2 in the current supply path between the pinion control relay 33 and the coil 23a. The other end of the abnormality detection wire Lm is connected to an input terminal Tin of the ECU 11. A voltage Vm developed at the specified point P2 is thus inputted to the ECU 11 through the input terminal Tin.

The ECU 11 further includes a current supply path abnormality detection circuit 53 for detecting abnormality in the current supply path of the coil 23a. Specifically, the current supply path abnormality detection circuit 53 includes a first comparator 54, a second comparator 55, two resistors 56 and 57 connected in series, two resistors 58 and 59 connected in series, a diode D1, and two resistors R1 and R2 connected in series. Non-inverting input terminals (positive terminals) of the first comparator 54 and the second comparator 55 are connected to the input terminal Tin. The resistors 56 and 57 divide a constant internal power source voltage VD (5V in the present embodiment), which is generated by lowering the battery voltage VB by a power source circuit (not shown) in the ECU 11 and input this divided voltage to an inverting input terminal (negative terminal) of the first comparator 54 as a first threshold voltage Vth1. The resistors 58 and 59 divide the internal power source voltage VD and input this divided voltage to an inverting input terminal (negative terminal) of the second comparator 55 as a second threshold voltage Vth2. An anode of the diode D1 is connected to a line of the internal power source voltage VD. One end and the other end of the resistor R1 are connected to a cathode of the diode D1 and the input terminal Tin, respectively. One end and the other end of the resistor R2 are connected to the resistor R1 and the input terminal Tin in common and to the ground line, respectively. Output voltages V1 and V2 of the first comparator 54 and the second comparator 55 are inputted to the microcomputer 41.

Figure 2:
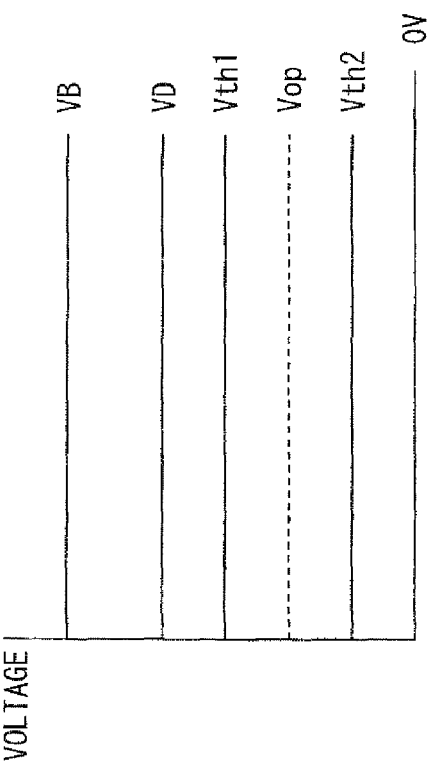
FIG. 2 is a graph showing a relation between a threshold voltage of a comparator and a power source voltage in the embodiment.

According to the current supply path abnormality detection circuit 53, when the pinion control relay 33 is in the off-state and a downstream current supply path (that is, current supply path from the specified point P2 to the ground line through the coil 23a) has a wire breakage (disconnection), a voltage Vm at the input terminal Tin becomes a voltage Vop indicated by a dotted line in FIG. 2. This voltage Vm is produced by dividing by the resistors R1 and R2 a voltage (Vd−Vf), which is lower than the internal power source voltage VD by a forward voltage Vf of the diode D1. Resistances of the resistors R1 and R2 are set to be sufficiently greater (for example, thousands of times) than that of the coil 23a.

Resistances of the resistors 56 and 57 are set so that the first threshold voltage Vth1 inputted to the first comparator 54 is higher than the voltage Vop as shown in FIG. 2. Resistances of the resistors 58 and 59 are set so that the second threshold voltage Vth2 inputted to the second comparator 55 is lower than the voltage Vop as shown in FIG. 2.

The ECU 11 further includes a primary side abnormality detection circuit 60 for diagnosing whether a current can be supplied normally to the coil of the pinion control relay 33. The primary side abnormality detection circuit 60 outputs a high level signal (voltage), when a voltage Vout of one output terminal connected to the coil of the pinion control relay 33 of output terminals of the transistor 52 is higher than a comparison threshold value, which is lower than the battery voltage VB but higher than the ground line potential (0V). The primary side abnormality detection circuit 60 outputs a low level signal (voltage) to the microcomputer 41, when the voltage Vout is lower than the comparison threshold value. The microcomputer 41 monitors the signal of the primary side abnormality detection circuit 60 while turning off the transistor 52. If the signal level is not high but low, the microcomputer 41 determines that the current supply path extending from the battery 15 to the ECU 11 through the coil of the pinion control relay 33 has a wire breakage, the downstream side of the coil of the pinion control relay 33 is shorted to the ground line or the transistor 52 has on-failure, in which the transistor 52 cannot be turned off from the on-state.

Fundamental principle of detection of current supply path abnormality by the current supply path abnormality detection circuit 53 is described next with reference to FIG. 3. It is assumed here that, as shown in FIG. 1, the current supply path from the battery 15 to the coil 23a is divided into sections A, B and C. The section A is defined to be from a branch point P1, from which the coil of the pinion control relay 33 is branched, to the upstream side contact of the pinion control relay 33. The section B is defined to be from the downstream side contact of the pinion control relay 33 to a specified point P2 (junction with an abnormality detection wire Lm). The section C is defined to be from the specified point P2 to the coil 23a. In FIG. 3, a relay-on instruction indicates that the microcomputer 41 drives the pinion control relay 33 to turn on, that is, to the on-state. In the present embodiment, it corresponds that the microcomputer 41 executes the instruction for turning on the transistor 52. A relay-off instruction indicates that the microcomputer 41 drives the pinion control relay 33 to turn off, that is, to the off-state. In the present embodiment, it corresponds that the microcomputer 41 executes the instruction for turning off the transistor 52.

If the current supply path to the coil 23a is normal as indicated in the column (a) of FIG. 3, the voltage Vm at the input terminal Tin (voltage at the specified point P2) rises substantially to the battery voltage VB (>Vth1) when the microcomputer 41 drives the pinion control relay 33 to turn on. Both output voltages V1 and V2 of the first comparator 54 and the second comparator 55 become high (Hi). In this instance, the diode D1 blocks flow of current from flowing in reverse from the input terminal Tin to the internal power source voltage VD.

Further, if the current supply path to the coil 23a is normal, the voltage Vm at the input terminal Tin becomes substantially 0V (<Vth2) when the microcomputer 41 drives the pinion control relay 33 to turn off. This is because the resistance of the coil 23a is set to be sufficiently smaller than that of the resistor R1. As a result, both output voltages V1 and V2 of the first comparator 54 and the second comparator 55 become low (Lo).

Column (c) of FIG. 3 indicates another case, in which either the section A or the section B in the current supply path to the coil 23 breaks, either the section B or the section C shorts to the ground line (GND short), or the pinion control relay 33 has off-failure and remains in the off-state, by which the pinion control relay 33 cannot be turned on. In such cases, the voltage Vm at the input terminal Tin becomes substantially 0V, even if the microcomputer 41 drives the pinion control relay 33 to turn on. Therefore, both output voltages V1 and V2 of the first comparator 54 and the second comparator 55 do not become high and remain low.

For this reason, if the output voltages V1 and V2 of the two comparators 54 and 55 are low even when the pinion control relay 33 is driven to turn on, it can be determined that the section A or B has the wire breakage, the section B or C has the shorting to the ground line or the pinion control relay 33 has the off-failure. All of these abnormalities are energization disability abnormalities, which disable current supply to the coil 23a.

It is noted that, when a wire breakage arises upstream the section A (that is, a current path from the battery 15 to the branch point P1) in the current supply path to the coil 23a, such a wire breakage is detectable in the similar manner as the wire breakage in the section A or the section B. In the present embodiment, it is assumed that the upstream part from the section A is confirmed to be normal by the diagnosis executed by the primary side abnormality detection circuit 60. Thus, wire breakage in the upstream part from the section A is not shown or described.

Column (d) of FIG. 3 indicates a further case, in which either the section B or the section C in the current supply path to the coil 23a shorts to the battery voltage VB (battery short) or the pinion control relay 33 has the on-failure, by which the pinion control relay 33 cannot be turned off. In such cases, the voltage Vm at the input terminal Tin becomes substantially the battery voltage VB, even if the microcomputer 41 drives the pinion control relay 33 to turn off. Therefore, both output voltages V1 and V2 of the first comparator 54 and the second comparator 55 do not become low and remain high.

For this reason, if the output voltages V1 and V2 of the two comparators 54 and 55 are high even when the pinion control relay 33 is driven to turn off, it can be determined that the section B or C has the shorting to the battery voltage VB or the pinion control relay 33 has the on-failure. All of these abnormalities are current interruption disability abnormalities, which continue current supply to the coil 23a.

Column (b) of FIG. 3 indicates other case, in which the downstream part from the specified point P2 in the current supply path to the coil 23a (that is, the section C, the coil 23a or the downstream part from the coil 23a) breaks. In such a case, the voltage Vm at the input terminal Tin becomes the voltage Vop (Vth1>Vop>Vth2), which is developed by the diode D1 and the resistors R1 and R2, if the microcomputer 41 drives the pinion control relay 33 to turn off. Therefore, the output voltage V1 of the first comparator 54 becomes low but the output voltage V2 of the second comparator 55 becomes high.

For this reason, if the output voltage V1 of the first comparator 54 is low and the output voltage V2 of the second comparator 55 is high when the pinion control relay 33 is driven to turn off, it can be determined that the voltage Vm at the input terminal Tin is the voltage Vop, that is, the current path downstream from the specified point P2 has the wire breakage.

Thus, abnormalities in the current supply path to the coil 23a can be detected distinguishedly based on combinations of the driven condition of the pinion control relay 33 and the output voltages V1 and V2 of the comparators 54 and 55.

Figure 4:
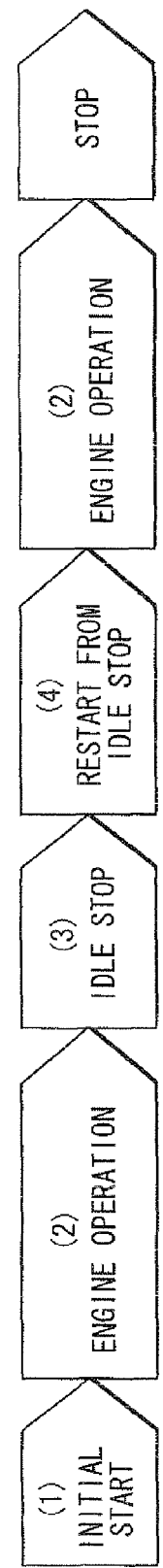
FIG. 4 is a sequence diagram showing engine control and operation states in time sequence in the embodiment.

The microcomputer 41 is programmed to execute various processing depending on operation states of the engine 10, which are shown in FIG. 4 in time sequence.

The microcomputer 41 first performs starter control processing to drive the starter 13 for engine starting, when the starter signal is changed to the active level (for example, high) by the starting operation made manually by a driver of a vehicle. This corresponds to the initial start state (1) shown in FIG. 4.

Specifically, the microcomputer 41 turns on the transistor 52 to turn on the pinion control relay 33. Thus, the coil 23a of the pinion control solenoid 23 is energized to engage the pinion gear 21 with the ring gear 25. Further, the microcomputer 41 turns on the transistor 51 to turn on the motor control relay 31 so that the electromagnetic switch 19 is turned on to energize the motor 17.

As a result, the motor 17 rotates with a current flowing from the battery 15 to the motor 17 so that the pinion gear 21 rotates the ring gear 25 by the rotary force of the motor 17. Thus, the engine 10 is cranked.

When the engine 10 is thus cranked, fuel is injected into the engine 10 and ignited by other ECU, which is provided to control the engine 10. If the engine 10 is a diesel engine, only fuel is injected and no ignition spark is provided. The ECU 11 may be configured to perform this engine control (fuel injection and spark ignition) as well.

After determining that the engine 10 is in the complete combustion state, that is, the engine 10 became operative without cranking by the starter 13 and engine starting is finished, the microcomputer 41 turns off the transistors 51 and 52 to stop the current supply to the motor 17. Thus, the pinion gear 21 is returned to the initial position, at which the pinion gear 21 is disengaged from the ring gear 25. The microcomputer 41 checks whether the engine 10 is in the complete combustion state in accordance with the rotation speed of the engine 10 by calculating the rotation speed based on the rotation signal.

The above-described processing is the initial starter control processing. When the engine 10 is in operation, it corresponds to the engine operation state (2) shown in FIG. 4, which is most typically vehicle traveling state. If the vehicle stops traveling during the engine operation, the microcomputer 41 automatically stops the engine 10 by stopping fuel injection to the engine 10 or shutting off an intake air supply passage to the engine 10 by determining that a predetermined automatic stop condition is satisfied.

When the engine 10 is automatically stopped, it corresponds to an idle stop state (3) shown in FIG. 4.

The automatic stop condition is satisfied, for example, when all the following requirements are met:
a battery voltage VB is equal to or higher than a predetermined voltage value;
a vehicle speed is less than a predetermined speed value;
a brake vacuum pressure is higher than a predetermined pressure value in absolute value;
a brake pedal is being depressed;
a shift position is at a neutral position, or at other position with a clutch pedal being depressed;
an accelerator pedal is not being depressed; and
more than a predetermined time has passed from restarting of an engine after automatically stopping the engine 10.

The microcomputer 41 performs the above-described starter control processing to restart the engine 10 by determining that a predetermined automatic start condition is satisfied during the idle stop.

This corresponds to a restart state (4) shown in FIG. 4.

The automatic restart condition is satisfied, for example, when any one of the following requirements is met:
a brake pedal is released from a depressed condition, when an idle stop is executed with a shift position being other than a neutral position and a clutch pedal is being depressed;
a clutch pedal is started to be released (that is, operation to connect a clutch by releasing depression of a clutch pedal) with a brake pedal being maintained depressed but a shift position being at other than a neutral position; and
a shift position is changed from a neutral position to other positions (a clutch pedal is still being depressed) with a brake pedal being depressed.

"Stop" indicated at the rightmost part in FIG. 4 means that the engine 10 is stopped by an engine stop operation made manually by a driver. In this instance, an ignition system power source in a vehicle is also turned off.

According to the present embodiment, the microcomputer 41 of the ECU 11 is programmed to execute processing for detecting abnormality in the current supply path to the coil 23a in each of initial engine start state ((1) in FIG. 4), engine operation state ((2) in FIG. 4) and engine idle stop state ((4) in FIG. 4). Each of these processing program is stored in a memory 42, which is a storage medium of the microcomputer 41.

Figure 5:
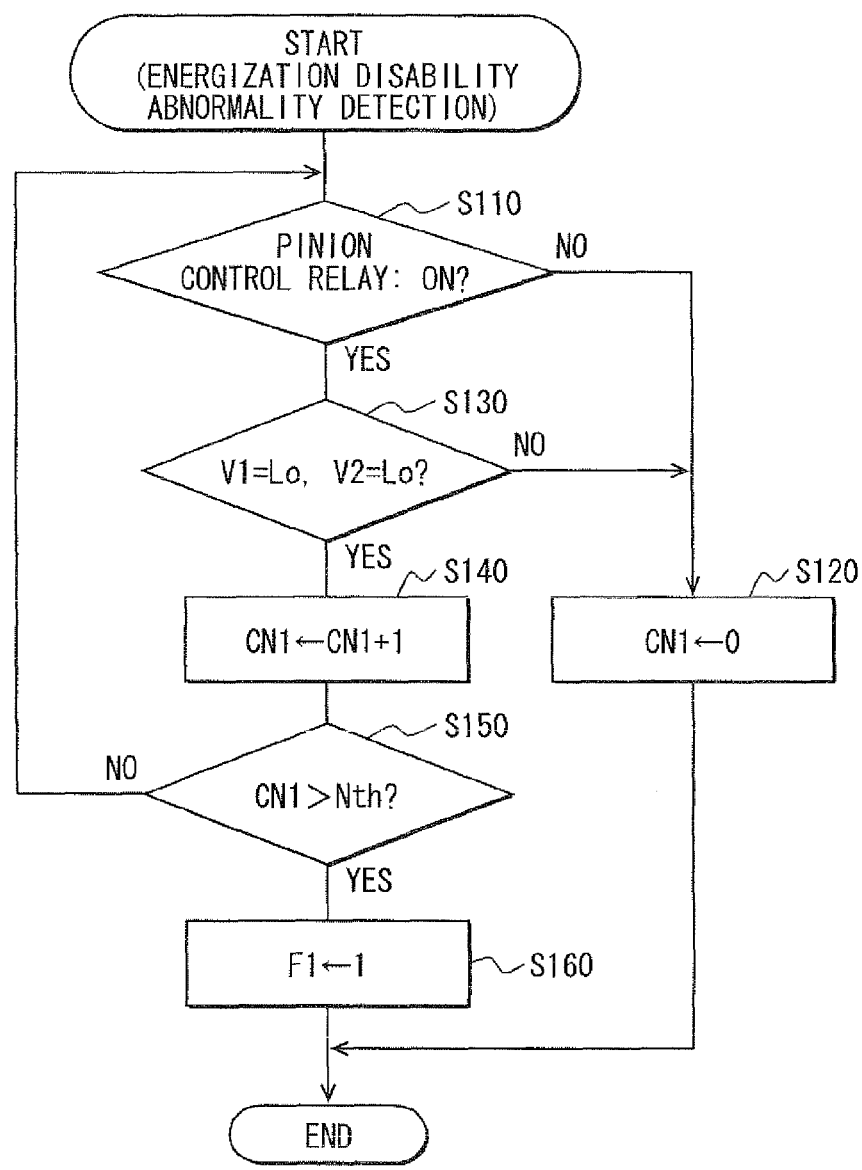
FIG. 5 is a flowchart showing energization disability abnormality detection processing executed in the embodiment.
Figure 6:
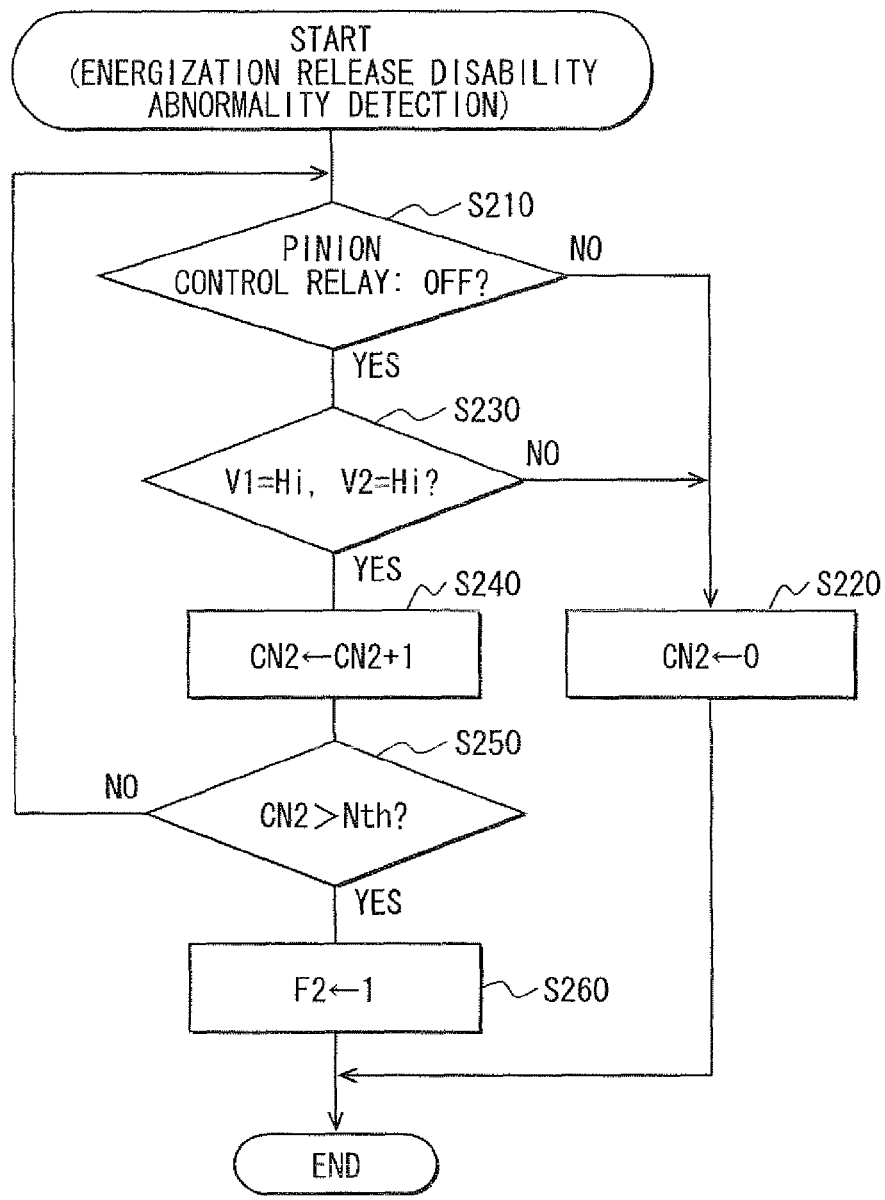
FIG. 6 is a flowchart showing energization release disability detection processing executed in the embodiment.
Figure 7:
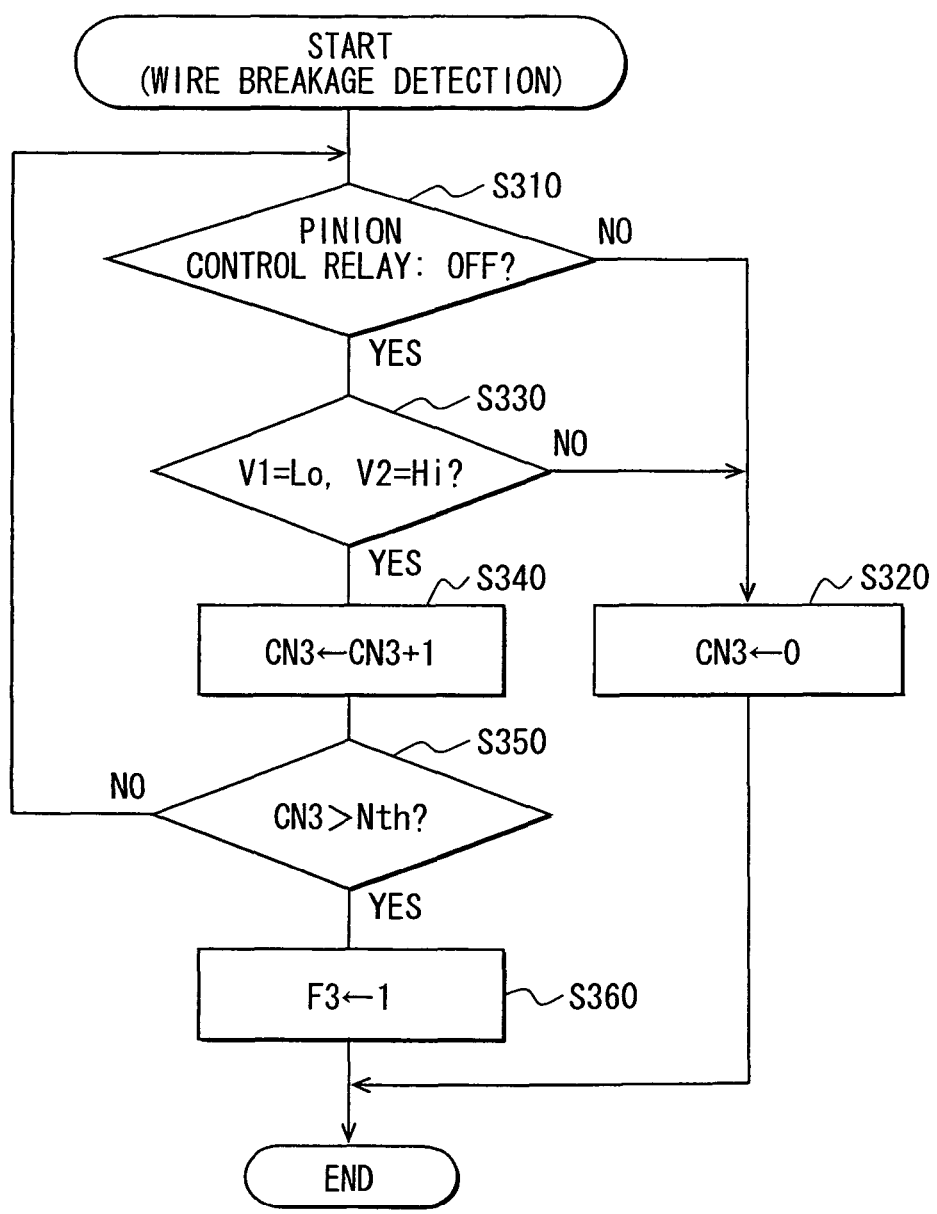
FIG. 7 is a flowchart showing wire break detection processing executed in the embodiment.

Each of the abnormality detection processing executed for detecting abnormality, which is indicated in each column (b), (c) and (d) of FIG. 3, is described first with reference to FIGS. 5 to 7. Time points for performing the abnormality detection processing shown in FIGS. 5 to 7 are described later.

First, energization disability detection processing is shown in FIG. 5. This processing is for detecting abnormality of energization disability in the current path to the pinion control solenoid 23 (that is, wire breakage in the section A or B, shorting of the section B or C to the ground line, or off-failure of the pinion control relay 33) indicated in the column (c) of FIG. 3.

When the microcomputer 41 starts execution of the energization disability detection processing, it is checked at S110 whether the pinion control relay 33 is being driven to turn on. Specifically, it is checked whether the transistor 52 is being turned on by outputting a drive signal in the active level (Hi in the present embodiment) to the transistor 52.

If the pinion control relay 33 is not being driven to the on-state, a counter (count value) CN1 is cleared to 0 at S120 and the energization disability abnormality detection processing is ended. The counter CN1 is for counting the number of negative determinations (NO) of this abnormality.

If it is determined at S110 that the pinion control relay 33 is being driven to the on-state, it is checked at S130 whether both output voltages V1 and V2 of the first comparator 54 and the second comparator 55 are low (Lo).

If any one of the output voltages V1 and V2 of the first comparator 54 and the second comparator 55 is not low, the counter CN1 is cleared at S120 and the energization disability abnormality detection processing is ended.

If it is determined at S130 that both output voltages V1 and V2 of the first comparator 54 and the second comparator 55 are low, it is provisionally determined that the energization disability abnormality, which is indicated in the column (c) of FIG. 3, is present. Then at S140 the counter CN1 is incremented by one. It is further checked at S150 whether the count of the counter CN1 exceeds an abnormality finalizing number Nth. If it does not exceed the abnormality finalizing number Nth, S110 and subsequent steps are repeated. If it exceeds the abnormality finalizing number Nth, that is, if the energization disability abnormality continues for more than a predetermined time, a flag F1 is set to 1 at S160 and the energization disability abnormality detection processing is ended. The flag F1 indicates that the energization disability abnormality indicated in the column (c) of FIG. 3 is present in the current supply path to the coil 23a.

That is, in the energization disability abnormality detection processing, it is checked whether the output voltages V1 and V2 of the comparators 54 and 55 are both low under the condition that the pinion control relay 33 is being driven to the on-state. If the number of affirmative determinations (YES) exceeds the abnormality finalizing number Nth, it is finally determined that the section A or the section B has the wire breakage, the section B or the section C has the shorting to the ground, or the pinion control relay 33 has the off-failure.

Next, energization release disability abnormality detection processing is shown in FIG. 6. This processing is for detecting the energization release disability abnormality (that is, shorting of the section B or the section C to the battery voltage VB or the on-state of the pinion control relay 33), which is indicated in the column (d) of FIG. 3. The energization release corresponds to deenergization.

As shown in FIG. 6, when the microcomputer 41 starts the energization release disability abnormality detection processing, it is checked at S210 whether the pinion control relay 33 is being driven to the off-state at present. Specifically, it is checked whether the transistor 52 is being driven to the off-state by outputting the drive signal to the transistor 52 in an inactive level (low level in the present embodiment).

If the pinion control relay 33 is not being driven to the off-state, a counter (count value) CN2 is cleared to 0 at S220 and the energization release disability abnormality detection processing is ended. The counter CN2 is for counting the number of negative determinations (NO) of this abnormality.

If it is determined at S210 that the pinion control relay 33 is being driven to turn off, it is checked at S230 whether both output voltages V1 and V2 of the first comparator 54 and the second comparator 55 are high (Hi).

If any one of the output voltages V1 and V2 of the first comparator 54 and the second comparator 55 is not high, the counter CN2 is cleared to 0 at S220 and the energization release disability detection processing is ended.

If it is determined at S230 that the output voltages V1 and V2 of the first comparator 54 and the second comparator 55 are both high, it is provisionally determined that the energization release disability abnormality, which is indicated in the column (d) of FIG. 3, is present. Then the counter CN2 is incremented by one at S240. It is further checked at S250 whether the count of the counter CN2 exceeds an abnormality finalizing number Nth. If it is not in excess of the abnormality finalizing number Nth, S210 is repeated. If it is in excess of the abnormality finalizing energization number Nth, that is, if the energization release disability abnormality continues for more than a predetermined time, a flag F2 is set to 1 at S260 and the energization release disability abnormality detection processing is ended. The flag F2 indicates that the energization release disability current supply path, which is indicated in the column (d) of FIG. 3, is present in the current supply path to the coil 23a.

That is, in the energization release disability abnormality detection processing, it is checked whether the output voltages V1 and V2 of the comparators 54 and 55 are both high under the condition that the pinion control relay 33 is being driven to the off-state. If the number of affirmative determinations exceeds the abnormality finalizing number Nth, it is finally determined that the section B or the section C has the shorting to the battery voltage VB or the pinion control relay 33 has the on-failure. The flag F2 is set to 1, which indicates that abnormality of the shorting or the off-failure is present.

Further, wire breakage detection processing is shown in FIG. 7. This processing is for detecting a wire breakage (breakage of current supply path downstream from the specified point P2) indicated in the column (b) of FIG. 3. As shown in FIG. 7, when the microcomputer 41 starts execution of the wire breakage detection processing, it is checked at S310 whether the pinion control relay 33 is presently being driven to the off-state in the similar manner as in S210 in FIG. 6.

If the pinion control relay 33 is not being driven to turn off, a counter (count value) CN 3 is cleared to 0 at S320 and the wire breakage detection processing is ended. The counter CN3 is for counting the number of negative determinations (NO) of this abnormality.

If it is determined at S310 that the pinion control relay 33 is being driven to the off-state, it is checked at S330 whether the output voltage V1 of the first comparator 54 is low and the output voltage V2 of the second comparator 55 is high.

If the output voltage V1 of the first comparator 54 is high or the output voltage V2 of the second comparator 55 is low, the counter CN3 is cleared to 0 at S320 and this wire breakage detection processing is ended.

If it is determined at S330 that the output voltage V1 of the first comparator 54 is low and the output voltage V2 of the second comparator 55 is high, it is provisionally determined that the wire breakage is present in the current supply path downstream from the specified point p2. Then the counter CN3 is incremented by one at S340. It is further checked at S350 whether the count value of the counter CN3 exceeds an abnormality finalizing number Nth. If it is not in excess of the abnormality finalizing number Nth, S310 is repeated. If it is in excess of the abnormality finalizing number Nth, that is, this abnormality continues for more than a predetermined time, a flag F3 is set to 1 at S360 and the wire breakage detection processing is ended. The flag F3 is a flag, which indicates that the current supply path downstream from the specified point P2 is broken.

That is, in the wire breakage detection processing, it is checked whether the output voltage V1 of the first comparator 54 is low and the output voltage V2 of the second comparator 55 is high under the condition that the pinion control relay 33 is being driven to the off-state. If the number of affirmative determinations (YES) exceeds the abnormality finalizing number Nth, it is finally determined that the downstream part of the current supply path from the specified point P2 has the wire breakage. The flag F2 is set to 1 to indicate this abnormality.

The abnormality finalizing number Nth may be different or the same among the processing shown in FIGS. 5 to 7, and the number may be 1, 2 or more. It is possible to provide a fixed time delay (for example, from several hundreds of microseconds (μs) to several tens of milliseconds (ms)) from the negative determination (NO) at S150 to repeated checking at S130 in FIG. 5. The same is also possible from the negative determination (NO) at S250 to repeated checking at S230 in FIG. 6 and from the negative determination (NO) at S350 to repeated checking at S330 in FIG. 7.

Figure 8:
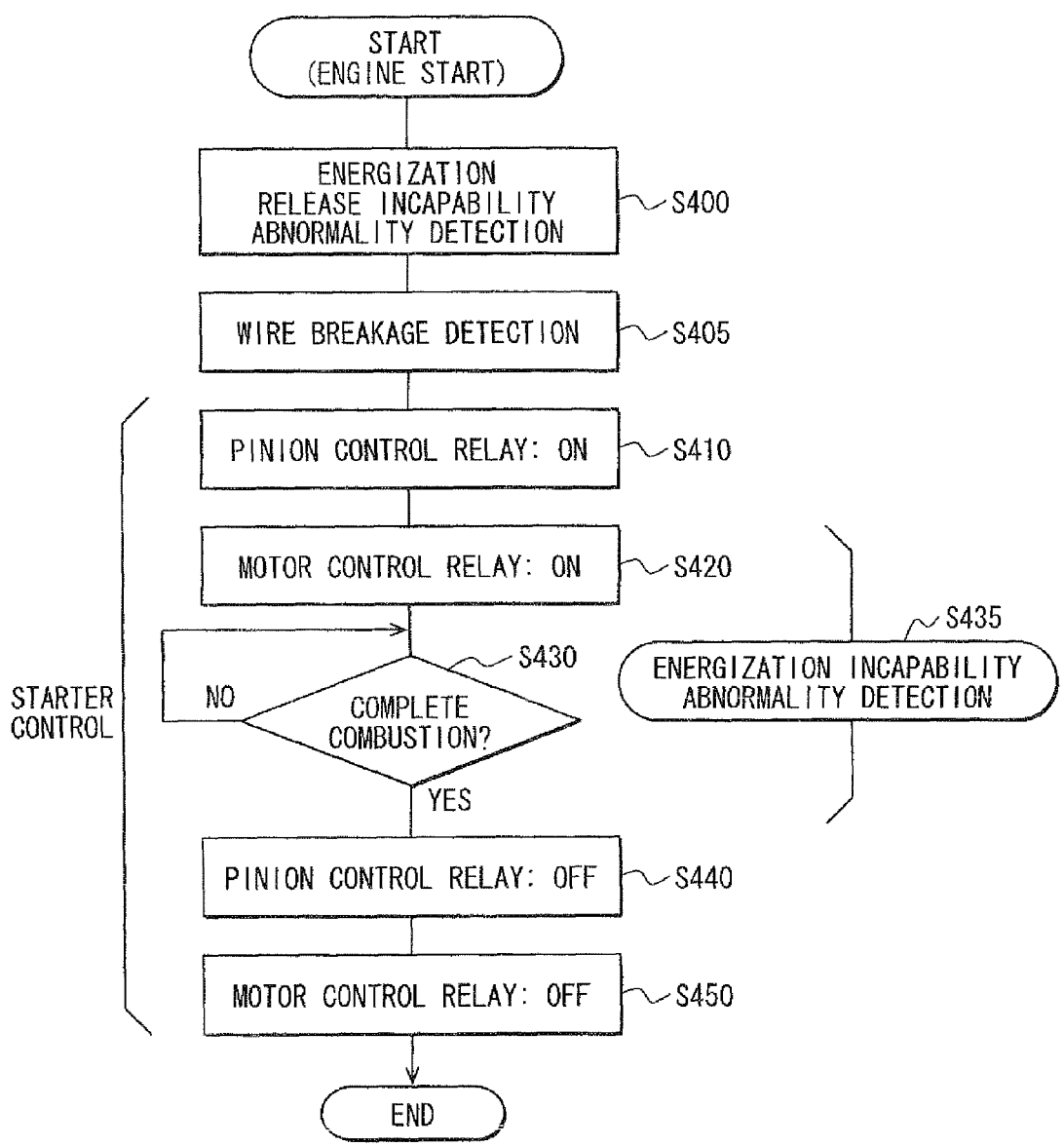
FIG. 8 is a flowchart showing engine start time processing executed in the embodiment.

Engine start time processing is shown in FIG. 8. This engine start time processing includes the above-described starter control processing and is executed at both of engine initial start time (manual start time) and engine restart time (automatic start time). That is, this processing is executed each time when a starter signal become active by the manual starting operation of the vehicle driver and the automatic starting condition is satisfied in the idle stop state.

As shown in FIG. 8, when the microcomputer 41 starts execution of the engine start time processing, the energization release disability abnormality detection processing shown in FIG. 6 is executed at S400 and then the wire breakage detection processing shown in FIG. 7 is executed at S405.

At the time of starting execution of the engine start time processing, the transistors 51 and 52 are driven to the off-states, respectively. As a result, the check result of S210 in the energization release disability abnormality detection processing (FIG. 6) executed in S400 becomes YES and the subsequent processing for abnormality detection is executed at S230 and subsequent steps. Similarly, the check result of S310 in the wire breakage detection processing (FIG. 7) executed in S405 becomes YES and subsequent processing for abnormality detection is executed at S330 and subsequent steps.

At next S410, the pinion control relay 33 is turned on by turning on the transistor 52. Then at S420, the motor control relay 31 is turned on by turning on the transistor 51. As long as the current supply path of the coil 23a is normal, the engine 10 is cranked by the starter 13. S410 and S420 may be executed in reversed order.

It is checked at next S430 whether the engine 10 has attained the complete combustion therein. If it is determined that the engine 10 is in the complete combustion state, the pinion control relay 33 is turned off by turning off the transistor 52 at S440 and the motor control relay 31 is turned off by turning off the transistor 51 at S450 thereby to stop cranking. The engine start time processing is ended at this time. Thus, current supply to the motor 17 of the starter 13, that is, energization of the motor 17, is stopped. If the current supply path of the coil 23a is normal, the pinion gear 21 is returned to the initial position, where the pinion gear 21 is disengaged from the ring gear 25.

The processing from S410 to S450 corresponds to the starter control processing. The processing of S400 and S405, which are executed immediately before the starter control processing, is finished within a short time period (for example, less than about 10 milliseconds), which will not affect adversely to the starting operation of the engine 10.

The microcomputer 41 performs the energization disability abnormality detection processing shown in FIG. 5 (S435 in FIG. 8) in parallel in the form of multi-task operation during a period from turning on the pinion control relay 33 at S410 to turning off the pinion control relay 33 at S440. For example, the processing of FIG. 5 is executed together with the processing of S420 and S430 by alternately executing the processing of S420 and S430 and all or a part of the processing of FIG. 5. In the energization disability abnormality detection processing (FIG. 5) executed in this way, the check result at S110 becomes YES and the processing for abnormality detection is executed at S130 and subsequent steps.

That is, the microcomputer 41 is programmed to perform, in both of the engine initial start time and the engine restart time, the energization release disability abnormality detection processing shown in FIG. 6 and the wire breakage detection processing shown in FIG. 7 (S400, S405) immediately before turning on the pinion control relay 33 by the starter control processing and the energization disability abnormality detection processing (S435) shown in FIG. 5 in the course of turning on the pinion control relay 33 by the starter control processing.

Figure 9A:
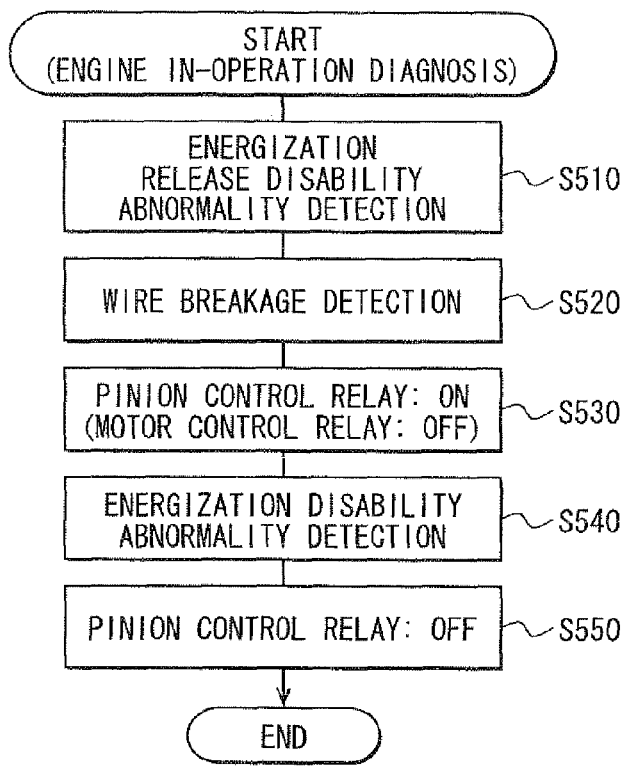
FIG. 9A is a flowchart showing engine in-operation diagnosis processing executed in the embodiment.

An engine in-operation diagnosis processing is shown in FIG. 9A. This processing is executed repetitively, for example, at a fixed time interval while the engine 10 is in operation.

As shown in FIG. 9A, when the microcomputer 41 starts execution of the engine in-operation diagnosis processing, the energization release disability abnormality detection processing shown in FIG. 6 is executed at S510 and the wire breakage detection processing shown in FIG. 7 is executed at next S520.

The microcomputer 41 generally drives the transistors 51 and 52 to be in the off-state because the starter 13 need not be operated in the engine operation state or the idle stop state. The check result at S210 in the energization release disability abnormality detection processing (FIG. 6) executed in S510 becomes YES, and the abnormality processing is executed at S230 and subsequent steps. Similarly, the check result at S310 in the wire breakage detection processing (FIG. 7) executed in S520 becomes YES, and the abnormality processing is executed at S330 and subsequent steps.

At next S530, only the transistor 52 of the transistors 51 and 52 is turned on to turn on only the pinion control relay 33 of the relays 31 and 33. At S540, the energization disability detection processing shown in FIG. 5 is executed. In the energization disability abnormality detection processing (FIG. 5) executed in this case, the check result at S110 becomes YES and the abnormality detection processing is executed at S130 and subsequent steps. At next S550, the pinion control relay 33 is turned off by turning off the transistor 52. Then, the engine in-operation processing is ended.

Figure 9B:
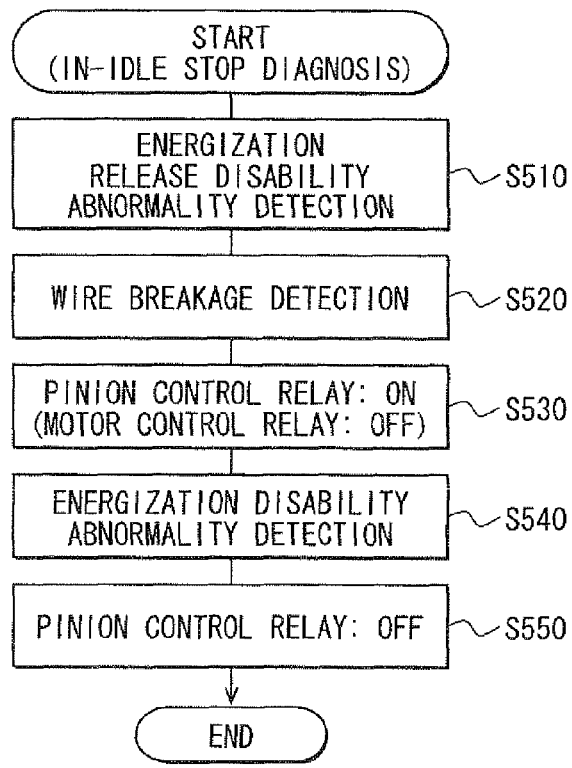
FIG. 9B is a flowchart showing in-idle stop diagnosis processing executed in the embodiment.

In-idle stop diagnosis processing is shown in FIG. 9B. This in-idle stop diagnosis processing is similar to the engine in-operation diagnosis processing shown in FIG. 9A and executed repetitively, for example, at a fixed time interval while the engine 10 is in idle stop operation.

The microcomputer 41 performs, in both the engine operation state and the idle stop state, the energization release disability abnormality detection processing shown in FIG. 6 and the wire breakage detection processing shown in FIG. 7 (S510, S520) under the state that the pinion control relay 33 is driven to be in the off-state. The microcomputer 41 further performs, in both the engine operation state and in the idle stop state, the energization disability abnormality detection processing shown in FIG. 5 (S530 to S550) by turning on only the pinion control relay 33 temporarily without turning on the motor control relay 31.

When any abnormality is detected in the processing of FIGS. 5 to 7, the microcomputer 41 performs fail-safe processing shown in FIG. 10. In FIG. 10, a user means a person of a vehicle, most typically a vehicle driver, who is authorized to use a vehicle.

In case that the energization disability abnormality is detected (that is, the flag F1 is set to 1) by the energization disability abnormality detection processing (FIG. 5) executed at S540 of the engine in-operation diagnosis processing (FIG. 9A), the following fail-safe processing A1 to A3 are executed as shown in FIG. 10.

[A1] Warning is provided to inform a vehicle driver that abnormality has occurred and is present.

Specifically, a buzzer is activated, a warning light is turned on and off, or a message indicating "a starter has abnormality and hence need be checked at a repair shop" is displayed on a display device in a sentence or produced in voice sound from a speaker.

[A2] Promotive processing is provided not to stop an engine (promotion of engine non-stop).

Specifically, for example, a message indicating "an engine will not be restarted if the engine is stopped" is displayed on a display device in a sentence or produced in sound from a speaker. Further, for example, it is also possible to disable engine stop unless a push-button, which is provided to start and stop an engine in a vehicle, is continuously pressed for more than a predetermined time longer than a normally required pressing time.

[A3] Idle stop (engine automatic stop) is prohibited.

When the energization disability abnormality, which is detected by the energization disability abnormality detection processing (FIG. 5), arises, the pinion gear 21 cannot be engaged with the ring gear 25. As a result, once the engine 10 is stopped, the engine 10 cannot be started again even if the motor 17 is energized, and hence the vehicle cannot be driven. For this reason, by performing the processing A2 and A3, the engine 10 is prohibited from being stopped manually and/or automatically so that the vehicle may not become inoperative to travel. To prohibit the engine 10 from being subjected to the idle stop operation, the microcomputer 41 continues to output engine drive signals to the engine control actuators 12 for continued fuel injection and ignition even in the engine idle state.

In case that the energization disability abnormality is detected by the energization disability abnormality detection processing (FIG. 5) executed at S540 of the engine in-idle stop diagnosis processing (FIG. 9B), the following fail-safe processing A4 and A5 are executed as shown in FIG. 10.

[A4] Same processing (warning of presence of abnormality to a driver) as A1 is provided.

[A5] A hazard light of a vehicle is turned on and off.

If the energization disability abnormality is detected by the energization disability abnormality detection processing during the idle stop state, it is likely that the engine 10 will not be started again thereafter. For this reason, a hazard light 61 of a vehicle is turned on and off thereby to call attention of a driver of the following vehicle or other vehicles and enhance safety.

In case that the energization disability abnormality is detected by the energization disability abnormality detection processing (FIG. 5), which is executed together with S420 and S430 of the engine start time processing (FIG. 8) at the time of restarting the engine 10, the following fail-safe processing A6 to A8 are executed as shown in FIG. 10.

[A6] Same processing (warning of presence of abnormality to a driver) as A1 is provided.

[A7] Same processing (turning on and off a hazard light of a vehicle) as A5 is provided. In case that the energization disability abnormality is detected by the energization disability abnormality detection processing at the time of restarting the engine 10 from the idle stop state, it is likely that the engine 10 will not be restarted. For this reason, a hazard light 61 of a vehicle is turned on and off thereby to call attention of a driver of the following vehicle or other vehicles and enhance safety.

[A8] Motor energization time in the starter control processing is limited to a predetermined time period. Specifically, it is checked whether a predetermined time period has elapsed after turning on the motor control relay 31 at S420 of FIG. 8. If the predetermined time period elapses before it is determined at S430 that the engine 10 has attained the complete combustion, the transistors 51 and 52 are turned off by jumping to S440.

When the energization disability abnormality is detected by the energization disability abnormality detection processing, the pinion gear 21 cannot be engaged with the ring gear 25. As a result, even if the relays 31 and 33 are driven to turn on (S410, S420) in the starter control processing, the motor 17 only idles and cannot start the engine 10. If this state continues for a long time, it is likely that the coil of the motor 17 will be burned. For this reason, a time period of energization of the motor 17 is limited to a predetermined time period, so that the motor 17 is protected from failure.

In case that the energization disability abnormality is detected by the energization disability abnormality detection processing (FIG. 5), which is executed together with S420 and S430 in the engine start time processing (FIG. 8) at the time of initially starting the engine 10, the following fail-safe processing A9 and A10 are executed.

[A9] Same processing (warning of presence of abnormality to a driver) as A1 is provided.

[A10] Same processing (limitation of motor energization time in the starter control processing to a predetermined time period) as A8 is provided. According to this processing A10, the motor 17 is protected from failure even at the time of initial starting of the engine 10. In case that the wire breakage is detected (that is, the flag F3 is set to 1) by the wire breakage detection processing (FIG. 7) executed in S520 of the engine in-operation diagnosis processing (FIG. 9A), fail-safe processing B1 to B3 similar to the above-described A1 to A3 are executed as shown in FIG. 10.

When the wire breakage (wire disconnection in the current path downstream from the specified point P2) is detected by the wire break detection processing (FIG. 7), the pinion gear 21 cannot be engaged with the ring gear 25. As a result, if the engine 10 is stopped, the engine 10 cannot be started again any more and the vehicle becomes inoperative for travel. By the same processing B2 and B3 as the processing A2 and A3, the engine 10 is prohibited from being stopped manually or automatically. Thus, it is avoided that the vehicle is disabled to travel.

In case that the wire breakage is detected by the wire breakage detection processing (FIG. 7) executed in S520 of the in-idle stop diagnosis processing (FIG. 9B), same fail-safe processing B4 and B5 as the processing A4 and A5 are executed as shown in FIG. 10.

If the wire breakage is detected by the wire breakage detection processing during the idle stop state, it is likely that the engine 10 will not be restarted thereafter. For this reason, a hazard light 61 of a vehicle is turned on and off (B5) thereby to call attention of a driver of the following vehicle or other vehicles and enhance safety.

In case that the wire breakage is detected by the wire breakage detection processing (FIG. 7) executed at S405 of the engine start time processing (FIG. 8) at the time of restarting the engine 10, same processing B6 to B8 as the processing A6 to A8 are executed as shown in FIG. 10.

It is likely that the engine 10 cannot be restarted at the time of restarting the engine 10 from the idle stop state if the wire breakage is detected by the wire breakage detection processing. Therefore a hazard light 61 of a vehicle is turned on and off (B7) to provide caution to a driver of the following vehicle and enhance safety. In this case, even if the engine 10 is cranked, the motor 17 only idles and is likely to suffer from burning of coil. Therefore, the time period of energization of the motor 17 is limited to a predetermined time period (B8) so that the motor 17 is protected from failure.

In case the wire breakage is detected by the wire breakage detection processing (FIG. 7) executed at S405 of the engine start time processing (FIG. 8) at the time of initial starting of the engine 10, same processing B9 and B10 as the processing A9 and A10 are executed as shown in FIG. 10. By the same processing B10 as the processing A10, the motor 17 is protected from failure at the time of initial starting of the engine 10.

In case that the energization release disability abnormality is detected (that is, flag F2 is set to 1) by the energization release disability abnormality detection processing (FIG. 6) executed at S510 of the engine in-operation diagnosis processing (FIG. 9A), the following fail-safe processing C1 to C5 are executed as shown in FIG. 10.

[C1] Same processing as A1 (warning of presence of abnormality to a vehicle driver) is provided.

[C2] A vehicle driver is advised to promote no-raise of engine rotation speed.

Specifically, for example, a message indicating "please do not raise engine rotation speed" is displayed in a sentence on a display device or provided in voice sound from a speaker. Further, for example, a red zone provided in a tachometer display may be expanded to a lower speed range so that the red zone starts from a lower speed point in a vehicle, which is capable of displaying a red zone variably in a tachometer.

That is, if the energization release disability abnormality is present, the pinion gear 21 remains engaged with the ring gear 25. As a result, if the engine rotation speed rises, it is likely that the pinion gear wears or a one-way clutch of the starter 13 deteriorates. For this reason, by promoting no-raise of engine speed, component parts of the starter 13 are protected from wear or deterioration.

[C3] Same processing (promotion of engine non-stop) as the processing A2 is executed.

[C4] Same processing (prohibition of idle stop) as the processing A3 is executed.

If the energization release disability abnormality continues for a long time, the coil 23a is likely to burn out and be broken. In this case, the pinion gear 21 cannot be engaged with the ring gear 25 any more and the engine 10 cannot be started. By performing the same processing C3 and C4 as the processing A2 and A3, it is prevented that the engine 10 is stopped manually or automatically and the vehicle becomes disabled to travel.

[C5] Engine rotation speed is limited and a hazard light is turned on and off.

As processing to limit the engine rotation speed, for example, fuel cut-off may be executed so that fuel injection is stopped when the engine rotation speed rises to a predetermined rotation speed. It is also possible in a vehicle having an automatic transmission to change a speed change ratio of the automatic transmission to a smaller ratio.

By thus limiting the engine rotation speed, it is surely suppressed that the component parts of the starter 13 wears and deteriorates. If the engine rotation speed is limited, it is likely that the vehicle cannot follow traffic of other vehicles. In this case, by turning on and off the hazard light 61, that is, by activating the hazard light 61 intermittently, a warning is provided to caution a driver of the following vehicle and other vehicles so that safety can be enhanced.

In case that the energization release disability abnormality is detected by the energization release disability abnormality detection processing (FIG. 6) executed at S510 of the in-idle stop diagnosis processing (FIG. 9B), the following fail-safe processing C6 to C8 are executed as shown in FIG. 10.

[C6] Same processing (warning of presence of abnormality to a vehicle driver) as the processing A1 is executed.

[C7] Same processing (advice of promotion of no-raise of engine rotation speed) as the processing C2.

It is effective to suppress wear or deterioration of component parts of the starter 13 by advising a vehicle driver not to raise the engine rotation speed by the processing C7 even in the idle stop state.

[C8] An engine is started.

Specifically, the engine 10 is started by cranking by turning on the transistors 51 and 52 in the similar manner as the starter control processing. It is possible in this case to turn on only the transistor 51, because current is continuously supplied to the coil 23a of the pinion control solenoid 23 irrespective of on/off of the transistor 52.

If the energization release disability abnormality is detected in the idle stop state, the engine restarting is tried whether the automatic starting condition is satisfied or not at that time. If the energization release disability abnormality continues for a long period, it is likely that the coil 23a burns out and the engine starting is disabled as described above. Therefore, by restarting the engine 10 before the coil 23a burns out, the vehicle is protected from being disabled to travel.

In case that the energization release disability abnormality is detected by the energization release disability abnormality detection processing (FIG. 6) executed at S400 of the engine start time processing (FIG. 8) at the time of restarting the engine 10, the following fail-safe processing C9 and C10 are executed as shown in FIG. 10.

[C9] Same processing (warning of presence of abnormality to a vehicle driver) is executed as the processing A1.

[C10] Same processing (promotion of no-raise of engine rotation speed) as the processing C2 is executed.

It is effective to advise a vehicle driver by the processing C10, even if it is at the time of engine starting, that an engine rotation speed should not be raised, because wear or degradation of component parts of the starter 13 will be thereby suppressed.

In case that the energization release disability abnormality is detected by the energization release disability abnormality detection processing (FIG. 6) executed at S400 of the engine start time processing (FIG. 8) at the time of initially starting the engine 10, the following fail-safe processing C11 and C12, which are the same as the processing C9 and C10, are executed as shown in FIG. 10.

According to the present embodiment, the ECU 11 can detect abnormalities indicated in the columns (b) to (d) of FIG. 3 in each of the engine operation time, the idle stop time and the engine initial start time separately in a simple configuration. The advantages described above with respect to each of the fail-safe processing can be provided by performing the fail-safe processing shown in FIG. 10 in accordance with the contents of detected abnormalities and the states of abnormality detection (engine operation time, idle stop time, engine restart time and engine initial start time).

According to the present embodiment, the electromagnetic switch 19 corresponds to motor energization switch means and the pinion control relay 33 corresponds to pinion control switch means. The microcomputer 41 corresponds to idle stop control means. Processing S410 to S450 (starter control processing) in the engine start time processing of FIG. 8 corresponds to control means.

Processing of S530 to S550 in the engine in-operation diagnosis processing of FIG. 9A corresponds to operation-time abnormality detection means. Processing of S530 to S550 in the in-idle stop diagnosis processing of FIG. 9B corresponds to idle stop-time abnormality detection means. The energization disability abnormality detection processing of FIG. 5 executed together with S420 and S430 in the engine start time processing of FIG. 8 at the engine restart time corresponds to abnormality detection means, for example, restart-time abnormality detection means. The energization disability abnormality detection processing of FIG. 5 executed together with S420 and S430 in the engine start time processing of FIG. 8 at the engine initial start time corresponds to abnormality detection means, for example, start-time abnormality detection means. The second threshold voltage Vth2 inputted to the second comparator 55 corresponds to an energization disability determination reference value. In case that the second comparator 55 is not provided, the first threshold voltage Vth1 inputted to the first comparator 54 corresponds to the energization disability determination reference value.

The energization release disability abnormality detection processing of FIG. 6 corresponds to energization release disability abnormality detection means. The first threshold voltage Vth1 inputted to the first comparator 54 corresponds to an energization fixation determination reference value. In case that the first comparator 54 is not provided, the second threshold voltage Vth2 inputted to the second comparator 55 corresponds to the energization fixation determination reference value.

Performing the energization release disability abnormality detection processing of FIG. 6 at S510 of FIG. 9A corresponds to operating energization release disability abnormality detection means during the engine operation. Performing the energization release disability abnormality detection processing of FIG. 6 at S510 of FIG. 9B corresponds to operating the energization release disability abnormality detection means during the idle stop operation. Performing the energization release disability abnormality detection processing of FIG. 6 at S400 of FIG. 8 corresponds to operating the energization release disability abnormality detection means before the control means drives the pinion control switch means to the on-state in both of the initial start time and the restart time.

The diode D1 and the resistors R1 and R2 correspond to intermediate voltage generation means and the generated voltage Vop corresponds to an intermediate voltage. The wire breakage detection processing corresponds to wire breakage detection means. Performing the wire breakage detection processing of FIG. 7 at S520 in FIG. 9A corresponds to operating the wire breakage detection means during the engine in-operation time. Performing the wire breakage detection processing of FIG. 7 at S520 in FIG. 9B corresponds to operating the wire breakage detection means during the idle stop time. Performing the wire breakage detection processing of FIG. 7 at S405 in FIG. 8 at the engine restart time corresponds to operating the wire breakage detection means before the control means drives the pinion control switch means to the on-state at the engine restart time. Performing the wire breakage detection processing of FIG. 7 at S405 in FIG. 8 at the engine initial start time corresponds to operating the wire breakage detection means before the control means drives the pinion control switch means to the on-state at the engine initial start time.

The present invention is described above with reference to one embodiment. However, the present invention is not limited to such an embodiment and may be implemented in different embodiments without departing from the spirit of the invention.

For example, processing S530 to S550 in the engine in-operation diagnosis processing of FIG. 9A (that is, performing the energization disability abnormality detection processing of FIG. 5 after turning on the pinion control relay 33 during the engine operation) may be implemented only when the engine rotation speed is less than a predetermined value (more specifically, only in case that the engine rotation speed is lower than the predetermined value but the automatic stop condition for idle stop is not satisfied).

The function as the idle stop control means may be provided by an additional microcomputer (not shown) different from the microcomputer 41 or by an additional ECU different from the ECU 11. This additional ECU may be provided, as shown by a dotted line in FIG. 1, as an engine control ECU or an idle stop control ECU 11a, which controls engine control actuators 12 for fuel injection and ignition in accordance with air amount, engine rotation speed and the like in the conventional manner. In the latter case, the ECU 11a may be configured to operate as follows. The ECU 11a first checks whether the automatic stop condition is satisfied during the engine operation. If it is determined that the automatic stop condition is satisfied, the ECU 11a automatically stops the engine 10 and supplies state information indicating the idle stop state to the ECU 11. The ECU 11a then checks whether the automatic start (restart) condition is satisfied. If it is determined that the automatic start condition is satisfied, the ECU 11a supplies an engine restart command to the ECU 11. In the ECU 11, the microcomputer 41 recognizes the engine operation state and the idle stop state in response to the state information. The microcomputer 41 performs the engine start time processing of FIG. 8 in response to the restart command. If the energization disability abnormality is determined by the microcomputer 41 in the ECU 11 by execution of the engine in-operation diagnosis processing (FIG. 9A), the microcomputer 41 applies an output signal indicating prohibition of the idle stop operation to the ECU 11a. Thus, the ECU 11a controls the engine control actuators 12 to maintain the fuel injection and ignition even if the predetermined idle stop condition is satisfied.

In case that the wire disconnection detection processing of FIG. 7 is not executed, one of the comparators 54 and 55, the diode D1 and the resistors R1 and R2 need not be provided. Although not so practical, the electromagnetic switch 19 may be provided as a separate body from the starter 13. The pinion control solenoid 23 may be manufactured initially as a separate body from the starter 13 and later assembled to the starter 13 in a process of manufacturing a vehicle.

With regard to the current supply path from the battery 15 to the coil 19a of the electromagnetic switch 19, shorting to the ground line, shorting to the battery voltage VB and breaking of wire may be detected separately by the similar configuration and processing as the abnormality detection about the current supply path to the coil 23a.

The current supply path for the pinion control solenoid 23 may be configured differently from that shown in FIG. 1, and the energization disability abnormality in the current supply path of the pinion control solenoid 23 may be determined based on other parameters than the voltage of the specified point P2. For example, a current flowing in the current supply path for the pinion control solenoid 23 may be measured directly for determining the energization disability abnormality.

What is claimed is:
1. A control apparatus for a vehicle, which includes
a starter having a motor and a pinion gear for cranking an engine by being driven to rotate by the motor under engagement with a ring gear of the engine, the pinion gear being switchable to a state of engagement with the ring gear and a state of disengagement from the ring gear irrespective of energization or deenergization of the motor, motor energization switch means provided in a current supply path between a power source and the motor and selectively driven to an on-state for conducting the current supply path and an off-state for interrupting the current supply path, a pinion control solenoid having a coil connected to a ground line at one end thereof, the pinion control solenoid driving the pinion gear to be engaged with the ring gear and disengaged from the pinion gear when a voltage of the power source is supplied and stopped to the other end of the coil, respectively, pinion control switch means provided in a current supply path between the power source and the other end of the coil and selectively driven to an on-state for conducting the current supply path and an off-state for interrupting the current supply path, and idle stop control means for automatically stopping the engine when a predetermined automatic stop condition is satisfied and thereafter automatically restarting the engine when a predetermined automatic restart condition is satisfied, the control apparatus comprising:

control means for driving both the pinion control switch means and the motor energization switch means to an on-state so that the starter cranks the engine in each of an initial start time, in which the engine is started in accordance with a starting operation of a driver, and a restart time, in which the idle stop control means restarts the engine; and operation-time abnormality detection means for driving only the pinion control switch means between the pinion control switch means and the motor energization switch means to the on-state during engine operation, checking whether a voltage at a specified point in a current supply path between the pinion control switch means and the coil is lower than a predetermined energization disability determination reference value in such a state that only the pinion control switch means is driven to the on-state, and determining that a coil energization disability abnormality is present when the voltage is lower than the predetermined energization disability determination reference value, the coil energization disability abnormality indicating that current supply to the coil is disabled, wherein the idle stop control means is prohibited from stopping the engine when the operation-time abnormality detection means determines presence of the coil energization disability abnormality.

2. The control apparatus according to claim 1, wherein:
the driver is advised not to stop the engine, when the operation-time abnormality detection means determines the presence of abnormality.

3. The control apparatus according to claim 1, further comprising:
Idle stop-time abnormality detection means for driving only the pinion control switch means between the pinion control switch means and the motor energization switch means to the on-state during idle stop operation, which is from stopping the engine to restarting the engine by the idle stop control means, checking whether the voltage at the specified point is lower than the predetermined energization disability determination reference value in such a driven state, and determining that the coil energization disability abnormality is present when the voltage is lower than the predetermined energization disability determination reference value.

4. The control apparatus according to claim 3, wherein:
a hazard light of the vehicle is activated to turn on and off when the idle stop-time abnormality detection means determines the present of abnormality.

5. The control apparatus according to claim 1, further comprising:
restart-time abnormality detection means for checking whether the voltage at the specified point is lower than the predetermined energization disability determination reference value in a state that the control means drives the pinion control switch means to the on-state in the restart time, and determining that the coil energization disability abnormality is present when the voltage is lower than the predetermined energization disability determination reference value.

6. The control apparatus according to claim 5, wherein:
a hazard light of the vehicle is activated to turn on and off when the restart-time abnormality detection means determines the presence of abnormality.

7. The control apparatus according to claim 5, wherein:
the control means limits a time period of driving the motor energization switch means to the on-state to a predetermined time period when the restart-time abnormality detection means determines the presence of abnormality.

8. The control apparatus according to claim 1, further comprising:
start-time abnormality detection means for checking whether the voltage at the specified point is lower than the predetermined energization disability determination reference value in a state that the control means drives the pinion control switch means to the on-state in the initial start time, and determining that the coil energization disability abnormality is present when the voltage is lower than the predetermined energization disability determination reference value.

9. The control apparatus according to claim 8, wherein:
the control means limits a time period of driving the motor energization switch means to the on-state to a predetermined time period when the start-time abnormality detection means determines the presence of abnormality.

10. The control apparatus according to claim 1, further comprising:
energization release disability abnormality detection means for checking whether the voltage at the specified point is higher than a predetermined energization fixture determination reference value in a state that the control means drives the pinion control switch means to the off-state, and determining that energization fixture abnormality is present when the voltage is higher than the predetermined energization fixture determination reference value, the energization fixture abnormality indicating that interruption of current supply to the coil is disabled.

11. The control apparatus according to claim 10, wherein:
the idle stop control means is prohibited from stopping the engine, when the energization release disability abnormality detection means determines the presence of abnormality during the engine operation.

12. The control apparatus according to claim 11, wherein:
the engine rotation speed is limited when the energization release disability abnormality detection means determines the presence of abnormality during the engine operation.

13. The control apparatus according to claim 12, wherein:
the hazard light is activated to turn on and off in addition to limiting the engine rotation speed.

14. The control apparatus according to claim 11, wherein:
the driver is advised not to stop the engine when the energization release disability abnormality detection means determines the presence of abnormality during the engine operation.

15. The control apparatus according to claim 10, wherein:
the engine is started when the energization release disability abnormality detection means determines the presence of abnormality during the idle stop operation time from stopping the engine to restarting the engine by the idle stop control means.

16. The control apparatus according to claim 10, wherein:
the energization release disability abnormality detection means is operated before the control means drives the pinion control switch means to the on-state in both or one of the initial start time and the restart time.

17. The control apparatus according to claim 10, wherein:
the driver is advised not to raise the rotation speed of the engine when the energization release disability abnormality detection means determines the presence of abnormality.

18. The control apparatus according to claim 1 further comprising:
intermediate voltage generation means, connected to an input terminal for inputting the voltage of the specified point, for raising the voltage inputted to the input terminal to a predetermined intermediate voltage, which is lower than a voltage of the power source and higher than a potential of the ground line, when the pinion control switch means is in the off-state and a wire breakage is present in a path extending from the specified point to the ground line through the coil; and
wire breakage detection means for checking whether the voltage inputted to the input terminal corresponds to the intermediate voltage under a state that the control means drives the pinion control switch means to the off-sate, and determining presence of wire breakage in the path from the specified point to the ground line through the coil when the voltage at the input terminal corresponds to the intermediate voltage.

19. The control apparatus according to claim 18, wherein:
the idle stop control means is prohibited from stopping the engine when the wire breakage detection means determines the presence of wire breakage during the engine operation.

20. The control apparatus according to claim 19, wherein:
the driver is advised not to stop the engine when the wire breakage detection means determines the presence of wire breakage during the engine operation.

21. The control apparatus according to claim 18, wherein:
the hazard light is activated to turn on and off, when the wire breakage detection means determines the presence of wire breakage during the idle stop time from stopping the engine and restarting the engine by the idle stop control means.

22. The control apparatus according to claim 18, wherein:
the hazard light is activated to turn on and off, when the wire breakage detection means determines the presence of wire breakage at the restart time before the control means drives the pinion control switch means to the on-state.

23. The control apparatus according to claim 22, wherein:
the control means limits a time period of driving the motor energization switch means to the on-state to a predetermined time period when the wire breakage detection means determines the presence of wire breakage at the restart time.

24. The control apparatus according to claim 18, wherein:
the control means limits a time period of driving the motor energization switch means to the on-state to a predetermined time period when the wire breakage detection means determines the presence of wire breakage before the control means drives the pinion control switch means to the on-state at the initial start time.

25. A control apparatus for a vehicle having an engine, a starter and an idle stop control part, which automatically stops the engine when a predetermined automatic stop condition is satisfied and automatically restart the engine by the starter when a predetermined automatic start condition is satisfied,
the control apparatus controlling the starter, which includes a motor, a pinion gear and a pinion control solenoid,
the pinion gear being provided for cranking the engine by being driven to rotate by the motor under engagement with a ring gear of the engine, the pinion gear being switchable to a state of engagement with the ring gear and a state of disengagement from the ring gear irrespective of energization or deenergization of the motor,
the pinion control solenoid having a coil connected to a ground line at one end thereof, the pinion control solenoid driving the pinion gear to be engaged with the ring gear and disengaged from the pinion gear when a voltage of the power source is supplied and stopped to the other end of the coil, respectively,
the control apparatus being electrically connected to a motor energization switch and a pinion control switch, and
the motor energization switch being provided in a current supply path between the power source and the motor and selectively driven to an on-state for conducting the current supply path and an off-state for interrupting the current supply path, and the pinion control switch being provided in a current supply path between the power source and the other end of the coil and selectively driven to an on-state for conducting the current supply path and an off-state for interrupting the current supply path,
wherein the control apparatus is configured to:
drive both the pinion control switch and the motor energization switch to an on-state so that the starter cranks the engine in each of an initial start time, in which the engine is started in accordance with a starting operation of a driver, and a restart time, in which the engine is restarted automatically by the idle stop control part;
drive only the pinion control switch between the pinion control switch and the motor energization switch to the on-state during engine operation;
check whether a voltage at a specified point in a current supply path between the pinion control switch and the coil is lower than a predetermined energization disability determination reference value in such a driven state, and determine that a coil energization disability abnormality is present when the voltage is lower than the predetermined energization disability determination reference value, the coil energization disability abnormality indicating that current supply to the coil is disabled; and
prohibit the idle stop control part from automatically stopping the engine when presence of the coil energization disability abnormality is determined.

26. A control system for a vehicle, which includes:
- a starter having a motor and a pinion gear for cranking an engine by being driven to rotate by the motor under engagement with a ring gear of the engine, the pinion gear being switchable to a state of engagement with the ring gear and a state of disengagement from the ring gear irrespective of energization or deenergization of the motor;
- a motor energization switch provided in a current supply path between a power source and the motor and selectively driven to an on-state for conducting the current supply path and an off-state for interrupting the current supply path;
- a pinion control solenoid having a coil connected to a ground line at one end thereof, the pinion control solenoid driving the pinion gear to be engaged with the ring gear and disengaged from the pinion gear when a voltage of the power source is supplied and stopped to the other end of the coil, respectively;
- a pinion control switch provided in a current supply path between the power source and the other end of the coil and selectively driven to an on-state for conducting the current supply path and an off-state for interrupting the current supply path; and
- a control apparatus configured to stop the engine when a predetermined automatic stop condition is satisfied and thereafter automatically restarting the engine when a predetermined automatic restart condition is satisfied,
- the control apparatus driving both the pinion control switch and the motor energization switch to an on-state so that the starter cranks the engine in each of an initial start time, in which the engine is started in accordance with a starting operation of a driver, and a restart time, in which the engine is automatically restarted, wherein the control apparatus is configured to drive only the pinion control switch between the pinion control switch and the motor energization switch to the on-state during engine operation, check whether a voltage at a specified point in a current supply path between the pinion control switch and the coil is lower than a predetermined energization disability determination reference value in such a driven state, and determine that a coil energization disability abnormality is present when the voltage is lower than the predetermined energization disability determination reference value, the coil energization disability abnormality indicating that current supply to the coil is disabled, and prohibit the engine from being stopped when presence of the energization disability abnormality is determined.

27. A control apparatus for a vehicle having an engine and a starter for performing idle stop control, which automatically stops the engine when a predetermined automatic stop condition is satisfied and automatically restarts the engine when a predetermined automatic start condition is satisfied by controlling the starter by using a motor energization switch and a pinion control switch,
- the starter including a motor, a pinion gear and a pinion control solenoid,
- the pinion gear being provided for cranking the engine by being driven to rotate by the motor under engagement with a ring gear of the engine, the pinion gear being switchable to a state of engagement with the ring gear and a state of disengagement from the ring gear irrespective of energization or deenergization of the motor, and
- the pinion control solenoid having a coil connected to a ground line at one end thereof, the pinion control solenoid driving the pinion gear to be engaged with the ring gear and disengaged from the pinion gear when a voltage of a power source is supplied and stopped to the other end of the coil, respectively,
- the motor energization switch being provided in a current supply path between the power source and the motor and selectively driven to an on-state for conducting the current supply path and an off-state for interrupting the current supply path, and
- the pinion control switch being provided in a current supply path between the power source and the other end of the coil and selectively driven to an on-state for conducting the current supply path and an off-state for interrupting the current supply path, wherein the control apparatus is configured to:

drive both the pinion control switch and the motor energization switch to an on-state so that the starter cranks the engine in each of an initial start time, in which the engine is started in accordance with a starting operation of a driver, and a restart time, in which the engine is restarted automatically;

drive only the pinion control switch between the pinion control switch and the motor energization switch to the on-state during engine operation;

check whether a voltage at a specified point in a current supply path between the pinion control switch and the coil is lower than a predetermined energization disability determination reference value in such a driven state, and determine that a coil energization disability abnormality is present when the voltage is lower than the predetermined energization disability determination reference value, the coil energization disability abnormality indicating that current supply to the coil is disabled; and prohibit the idle stop control, which automatically stops the engine, when presence of the coil energization disability abnormality is determined.

28. A non-transitory computer-readable storage medium storing program instructions to operate a control apparatus for an idle stop vehicle having an engine and a starter for performing idle stop control, which automatically stops the engine when a predetermined automatic stop condition is satisfied and automatically restarts the engine when a predetermined automatic start condition is satisfied by controlling the starter by using a motor energization switch and a pinion control switch,
- the starter including a motor, a pinion gear and a pinion control solenoid,
- the pinion gear being provided for cranking the engine by being driven to rotate by the motor under engagement with a ring gear of the engine, the pinion gear being switchable to a state of engagement with the ring gear and a state of disengagement from the ring gear irrespective of energization or deenergization of the motor, and
- the pinion control solenoid having a coil connected to a ground line at one end thereof, the pinion control solenoid driving the pinion gear to be engaged with the ring gear and disengaged from the ring gear when a voltage of the power source is supplied and stopped to the other end of the coil, respectively,
- the motor energization switch being provided in a current supply path between the power source and the motor and selectively driven to an on-state for conducting the current supply path and an off-state for interrupting the current supply path, and the pinion control switch being provided in a current supply path between the power source and the other end of the coil and selectively driven to an on-state for conducting the current supply path and an off-state for interrupting the current supply path,
wherein the computer-readable storage medium stores therein:
a start instruction for driving both the pinion control switch and the motor energization switch to an on-state so that the starter cranks the engine in each of an initial start time, in which the engine is started in accordance with a starting operation of a driver, and a restart time, in which the engine is restarted automatically by the control apparatus;
a check instruction for driving only the pinion control switch between the pinion control switch and the motor energization switch to the on-state during engine operation, checking whether a voltage at a specified point in a current supply path between the pinion control switch and the coil is lower than a predetermined energization disability determination reference value in such a driven state, and determining that a coil energization disability abnormality is present when the voltage is lower than the predetermined energization disability determination reference value, the coil energization disability abnormality indicating that current supply to the coil is disabled; and
a prohibition instruction for prohibiting the idle stop control, which automatically stops the engine, when presence of the coil energization disability abnormality is determined.

29. A control method for a vehicle having an engine, a control apparatus and a starter,
the starter including a motor and a pinion gear for cranking the engine by being driven to rotate by the motor under engagement with a ring gear of the engine, the pinion gear being switchable to a state of engagement with the ring gear and a state of disengagement from the ring gear irrespective of energization or deenergization of the motor,
the control apparatus including a motor energization switch, a pinion control solenoid and a pinion control switch,
the motor energization switch being provided in a current supply path between a power source and the motor and selectively driven to an on-state for conducting the current supply path and an off-state for interrupting the current supply path,
the pinion control solenoid having a coil connected to a ground line at one end thereof, the pinion control solenoid driving the pinion gear to be engaged with the ring gear and disengaged from the pinion gear when a voltage of the power source is supplied and stopped to the other end of the coil, respectively,
the pinion control switch provided in a current supply path between the power source and the other end of the coil and selectively driven to an on-state for conducting the current supply path and an off-state for interrupting the current supply path,
the control apparatus being configured to perform idle stop control, which stops the engine when a predetermined automatic stop condition is satisfied and thereafter restarts the engine when a predetermined automatic restart condition is satisfied, and
the control apparatus being configured to drive both the pinion control switch and the motor energization switch to an on-state so that the starter cranks the engine in each of an initial start time, in which the engine is started in accordance with a starting operation of a driver, and a restart time, in which the engine is restarted by the idle stop control,
the control method comprising steps of:
driving only the pinion control switch between the pinion control switch and the motor energization switch to the on-state during engine operation;
checking whether a voltage at a specified point in a current supply path between the pinion control switch and the coil is lower than a predetermined energization disability determination reference value in such a driven state, and determining that a coil energization disability abnormality is present when the voltage is lower than the predetermined energization disability determination reference value, the coil energization disability abnormality indicating that current supply to the coil is disabled; and
prohibiting the engine from being stopped by the idle stop control when presence of the energization disability abnormality is determined.

30. A control method for a vehicle having an engine, a battery, a starter, which includes a motor, a pinion gear and a pinion control actuator, and a pinion control switch connected in series with the battery and the pinion control actuator,
wherein the engine is automatically stopped when a predetermined idle stop condition is satisfied, and the engine is restarted by automatically supplying currents to the motor and the pinion control actuator for cranking the engine by the motor through the pinion gear when a predetermined restart condition is satisfied,
the control method comprising steps of:
turning on the pinion control switch to supply the current to the pinion control actuator from the battery while the engine is in operation for vehicle travel with the motor being in a deenergized state;
checking current supply to the pinion control actuator to determine whether an abnormality is present in a current supply path from the battery to the pinion control actuator; and
prohibiting the engine from being automatically stopped in response to satisfaction of the predetermined idle stop condition, when presence of the abnormality in the current supply path is determined.

31. The control method according to claim 30, wherein:
the abnormality in the current supply path determined by the step of checking includes at least one of disability of energization of the pinion control actuator, disconnection of the current supply path to the pinion control actuator and disability of releasing current flow in the current supply path to the pinion control actuator.

* * * * *